(12) United States Patent
Portocalis et al.

(10) Patent No.: US 10,173,884 B2
(45) Date of Patent: *Jan. 8, 2019

(54) FUEL DATA COLLECTION UNIT WITH TEMPERATURE COMPENSATION AND OVER-FILL PREVENTION

(71) Applicant: QT TECHNOLOGIES, Dallas, TX (US)

(72) Inventors: Gerasimos A. Portocalis, Dallas, TX (US); David A. Conley, Desota, TX (US); Steven T. Jackson, Norcross, GA (US)

(73) Assignee: QT TECHNOLOGIES, Dallas, TX (US)

( * ) Notice: Subject to any disclaimer, the term of this patent is extended or adjusted under 35 U.S.C. 154(b) by 444 days.

This patent is subject to a terminal disclaimer.

(21) Appl. No.: 14/734,142

(22) Filed: Jun. 9, 2015

(65) Prior Publication Data

US 2016/0002024 A1 Jan. 7, 2016

Related U.S. Application Data

(62) Division of application No. 13/331,616, filed on Dec. 20, 2011, now Pat. No. 9,233,828.

(Continued)

(51) Int. Cl.
*B67D 7/08* (2010.01)
*B67D 7/14* (2010.01)
(Continued)

(52) U.S. Cl.
CPC ............... *B67D 7/08* (2013.01); *B67D 7/04* (2013.01); *B67D 7/145* (2013.01); *B67D 7/222* (2013.01);
(Continued)

(58) Field of Classification Search
CPC ........ B67D 7/04; B67D 7/401; B67D 7/0476; B67D 7/0478; B67D 7/0482;
(Continued)

(56) References Cited

U.S. PATENT DOCUMENTS 3,937,083 A 2/1976 Sabatino et al.
3,980,111 A 9/1976 Badger
(Continued)

FOREIGN PATENT DOCUMENTS

FR 2759455 8/1998
GB 937257 9/1963
(Continued)

OTHER PUBLICATIONS

International Preliminary Report on Patentability for Application Serial No. PCT/US2011/066110; The International Bureau of WIPO; Geneva, Switzerland; dated Jul. 11, 2013; 7 pages.

(Continued)

*Primary Examiner* — Crystal J Barnes-Bullock
(74) *Attorney, Agent, or Firm* — Gardner Groff Greenwald & Villanueva

(57) ABSTRACT

A fueling data collection unit associated with a fuel transfer apparatus and for use with a system for managing fueling transactions of a fleet operator using fuel transfer apparatuses at one or more locations includes a fueling data interface module and a temperature compensation module. The temperature compensation module compensates for a volume variance of the fuel as a result of temperature variance from the standard temperature data to determine a volume correction factor at the measured fuel temperature, while the temperature compensation module uses the measured fuel temperature to determine a compensated, more accurate volume and/or mass of fuel dispensed through the fuel meter. In this way, the fuel data collection unit can (Continued)

accurately measure the volume and/or mass of fuel being delivered. This allows the provider and the recipient to more accurately sell/buy what was actually delivered and can avoid over-filling a fueling order.

17 Claims, 26 Drawing Sheets

Related U.S. Application Data

(60) Provisional application No. 61/446,691, filed on Feb. 25, 2011.

(51) Int. Cl.
| | |
|---|---|
| B67D 7/22 | (2010.01) |
| B67D 7/30 | (2010.01) |
| B67D 7/32 | (2010.01) |
| G01F 15/00 | (2006.01) |
| G01F 15/02 | (2006.01) |
| G01F 15/06 | (2006.01) |
| B67D 7/04 | (2010.01) |
| G05B 15/02 | (2006.01) |

(52) U.S. Cl.
CPC ............. *B67D 7/303* (2013.01); *B67D 7/32* (2013.01); *G01F 15/003* (2013.01); *G01F 15/02* (2013.01); *G01F 15/024* (2013.01); *G01F 15/063* (2013.01); *G05B 15/02* (2013.01)

(58) Field of Classification Search
CPC ......... B67D 7/0486; B67D 7/06; B67D 7/08; B67D 7/222; B67D 7/228; B67D 7/30; B67D 7/42; G01F 1/72; G01F 1/76; G01F 1/78; G01F 1/86; G01F 15/001; G01F 15/002; G01F 15/02; G01F 15/022; G01F 15/024; G01F 15/04; G01F 15/043; G01F 15/046; G07F 13/02; G07F 13/025; G07F 13/04; G07F 15/00; G07F 15/001; G07F 15/12; G06Q 20/204; G06Q 50/06; H04Q 2209/60; B60S 5/02; B64F 1/28
See application file for complete search history.

(56) References Cited

U.S. PATENT DOCUMENTS

| | | | |
|---|---|---|---|
| 4,157,662 A | 6/1979 | Granberg | |
| 4,230,937 A | 10/1980 | Smilgys et al. | |
| 4,296,472 A | 10/1981 | Sarkis | |
| 4,442,953 A | 4/1984 | Yoshikazu | |
| 4,450,820 A * | 5/1984 | Haynes ................. | F02D 33/006 123/514 |
| 4,593,729 A | 6/1986 | Tamra | |
| 4,612,804 A * | 9/1986 | Colonnello ............. | G01F 3/10 73/114.52 |
| 4,637,525 A | 1/1987 | Miura et al. | |
| 4,819,183 A | 4/1989 | O'Brien et al. | |
| 5,257,651 A | 11/1993 | Thompson et al. | |
| 5,265,032 A | 11/1993 | Patel | |
| 5,319,545 A | 6/1994 | Mcgarvey et al. | |
| 5,557,084 A | 9/1996 | Myers | |
| 5,592,979 A * | 1/1997 | Payne ................. | B67D 7/0486 141/192 |
| 5,596,501 A | 1/1997 | Comer et al. | |
| 5,602,745 A * | 2/1997 | Atchley ................. | B67D 7/222 222/23 |
| 5,613,778 A | 3/1997 | Lawson | |
| 5,645,115 A | 7/1997 | Kesterman et al. | |
| 5,706,273 A | 1/1998 | Guerreri | |
| 5,785,100 A | 7/1998 | Showalter et al. | |
| 5,816,491 A | 10/1998 | Berkeley et al. | |
| 5,868,179 A | 2/1999 | Hartsell, Jr. | |
| 5,923,572 A | 7/1999 | Pollock | |
| 6,119,058 A | 9/2000 | Anderberg | |
| 6,374,187 B1 | 4/2002 | Knight et al. | |
| 6,390,151 B1 | 5/2002 | Christman et al. | |
| 6,438,452 B1 * | 8/2002 | Dickson ............... | B67D 7/0486 700/241 |
| 6,546,314 B1 | 4/2003 | Carr et al. | |
| 6,816,762 B2 | 11/2004 | Hensey et al. | |
| 6,835,223 B2 | 12/2004 | Walker et al. | |
| 7,228,210 B2 | 6/2007 | Davis et al. | |
| 7,353,703 B2 | 4/2008 | Kunter | |
| 7,376,495 B2 | 5/2008 | Coggins | |
| 7,463,971 B2 | 12/2008 | Holcomb et al. | |
| 7,536,264 B2 | 5/2009 | Hillam | |
| 7,642,742 B2 | 1/2010 | Curello et al. | |
| 7,647,163 B2 | 1/2010 | Allen | |
| 7,725,271 B2 | 5/2010 | Yang et al. | |
| 8,055,526 B2 | 11/2011 | Blagg et al. | |
| 8,371,533 B2 | 2/2013 | Tichborne et al. | |
| 2001/0034567 A1 | 10/2001 | Allen et al. | |
| 2002/0065698 A1 | 5/2002 | Schick et al. | |
| 2003/0149491 A1 | 8/2003 | Adachi et al. | |
| 2004/0030457 A1 | 2/2004 | Bayoumi et al. | |
| 2004/0117135 A1 | 6/2004 | Rogers et al. | |
| 2008/0126111 A1 | 5/2008 | Loda | |
| 2008/0195442 A1 | 8/2008 | Blagg et al. | |
| 2009/0032548 A1 * | 2/2009 | Larsson ................. | B67D 7/228 222/1 |
| 2009/0164347 A1 | 6/2009 | Sison et al. | |
| 2010/0036596 A1 | 2/2010 | Dunsky | |
| 2010/0114616 A1 | 5/2010 | Touati | |
| 2011/0130883 A1 | 6/2011 | Perez | |
| 2011/0140877 A1 | 6/2011 | Gilchrist et al. | |
| 2011/0247705 A1 | 10/2011 | Humphrey | |
| 2012/0043425 A1 | 2/2012 | Beck | |
| 2012/0182156 A1 | 7/2012 | Portcolais et al. | |

FOREIGN PATENT DOCUMENTS

| | | |
|---|---|---|
| GB | 954389 | 4/1964 |
| WO | WO2006076577 | 7/2006 |

OTHER PUBLICATIONS

International Search Report and Written Opinion; dated Jun. 12, 2012, 19 pages; European Patent Office, P.B. 5818 Patentlaan 2, NL-2280 HV Rijswijk.

* cited by examiner

| Terminal Block J2 | Function | Notes |
| --- | --- | --- |
| 1 | Vin - | |
| 2 | Vin + | 8-36 VDC |
| 3 | Pulse 2 Input | Pulse Transmitter 2 |
| 4 | Pulse 1 input | Pulse Transmitter 1 |
| 5 | Vout + | Pulse transmitter power |
| 6 | RTD A | Temperature Input |
| 7 | RTD B | |
| 8 | RTD C | |

| Terminal Block J3 | Function | Notes |
| --- | --- | --- |
| 1 | TX | RS-232 Transmit |
| 2 | RX | RS-232 Receive |
| 3 | G | Ground |
| 4 | 1 | Digital Output 1 |
| 5 | 2 | Digital Output 1 |
| 6 | 3 | Digital Output 2 |
| 7 | 4 | Digital Output 2 |
| 8 | Vout | Digital Output Power |

FIG. 23

FUEL DATA COLLECTION UNIT WITH TEMPERATURE COMPENSATION AND OVER-FILL PREVENTION

CROSS-REFERENCE TO RELATED-APPLICATION

This application is a divisional of U.S. Non-Provisional patent application Ser. No. 13/331,616, filed Dec. 20, 2011, which claims the priority benefit of U.S. Provisional Patent Application Ser. No. 61/446,691, filed Feb. 25, 2011, which are hereby incorporated herein by reference.

TECHNICAL FIELD

The present invention relates to a fuel management device for users of fuels, such as aviation fleets, and in particular relates to a fuel data collection unit for capturing fuel data and forwarding it on to a fuel management system.

BACKGROUND OF THE INVENTION

Temperature variations can affect the volume of a given mass of fuel due to the fuel expanding or contracting with varying temperature. Typically, as fuels are dispensed, the dispensed fuel is measured in gallons (by volume), and the weight of the dispensed fuel often is not known accurately. In aviation refueling, this can present a serious safety issue, inasmuch as it is critically important that the pilot have accurate information about the weight of the fuel that has been loaded onto the plane. Moreover, inaccurate fueling information can lead to the provider or the recipient being short-changed.

Accordingly, a need exists for a fueling technology to compensate for variations in fuel temperature.

SUMMARY OF THE INVENTION

Briefly described, in a first preferred form the invention comprises a fueling data collection unit for use with a meter and a register having a pulser and associated with a fuel transfer apparatus and for use with a system for managing fueling transactions of a fleet operator using fuel transfer apparatuses at one or more locations. The fueling data collection unit includes a fueling data interface module and a temperature compensation module. The temperature compensation module receives fueling information from the meter register and uses the density of the fuel at a standard temperature and the measured fuel temperature data to compensate for a volume variance of the fuel as a result of temperature variance from the standard temperature data to determine a volume correction factor at the measured fuel temperature, the temperature compensation module using the measured fuel temperature to determine a compensated, more accurate volume and/or mass of fuel dispensed through the fuel meter. In this way, the fuel data collection unit can accurately measure the volume and/or mass of fuel being delivered. This allows the provider and the recipient to more accurately sell/buy what was actually delivered.

Optionally, this temperature compensation facilitates the avoidance of over-filling a fueling order. Such can be very important in certain applications (like in aviation, where the weight of the fuel in the aircraft change its flying characteristics and fuel efficiency). In one optional way of accomplishing this, a fuel order quantity is converted into a maximum pulse count set point and when that maximum pulse count set point is reached, the fueling data unit transmits a signal to discontinue the flow of fuel. Thus, the compensated, more accurate volume and/or mass of fuel dispensed through the fuel meter can be used in conjunction with a pre-ordered refueling quantity to prevent the fuel transfer apparatus from transferring more than a pre-ordered refueling quantity.

Optionally, the fueling data collection unit can be battery powered.

In another preferred form, the present invention comprises a fueling data collection unit provided with an over-fill prevention feature for using a pre-ordered refueling quantity to prevent the fuel transfer apparatus from transferring more than the pre-ordered refueling quantity, the over-fill prevention feature comparing the pre-ordered refueling quantity with a dispensed quantity and once the dispensed quantity reaches the pre-ordered refueling quantity, the fueling data collection unit generates a signal to discontinue refueling.

Optionally, the fueling data collection unit includes a includes an internal battery power source and a processor is provided for monitoring the power level in the battery and for detecting if the power level in the battery drops below a threshold amount. Also, an optional communications module can be provided for wirelessly forwarding an alert to a remote computer to alert the remote computer that the battery power is low.

Optionally, the battery-powered fueling data collection unit can include a solar-powered battery charger for charging the battery. Alternatively, the unit's battery can be recharged by an external battery charger, such as an alternator or generator on the fueling apparatus.

Optionally, the battery-powered fueling data collection unit communicates wirelessly with a local hand-held computer device. In one form, it does so to wirelessly forward an alert to a remote computer via a local computing device to alert the remote computer that the battery power is low. The communications module can initiate the communications via cellular, Wi-Fi, Bluetooth, etc.

Optionally, the fueling data collection unit monitors the maintenance status of the fuel transfer apparatus and is operable for communicating the monitored maintenance status to a remote computer by relaying it through a local computing device. For example, the fueling data collection unit can monitor the maintenance status of one or more fuel filters in the fuel transfer apparatus by monitoring fuel pressures upstream and downstream of the filter(s) to determine whether the filter(s) is clogged and needs to be replaced.

Optionally, the battery-powered fueling data collection unit can be operative to monitor the functioning status of the fuel transfer apparatus and for communicating the monitored functioning status to a remote computer by relaying the information through a local computer.

Optionally, the battery-powered fueling data collection unit's fueling data interface module has multiple input ports, at least one for connection to a fueling meter with a mechanical register using pulses and one for connection to an electronic register.

BRIEF DESCRIPTION OF THE DRAWING FIGURES

FIG. 1 is a perspective illustration of a prior art fuel cart.
FIG. 2 is a partly exploded perspective view of a portion of the prior art fuel cart of FIG. 1.
FIG. 3 is a schematic block diagram of a battery-powered fueling data collection unit for use with a meter and a register associated with a fuel transfer apparatus according to a first example form of the invention.

Figure 4:
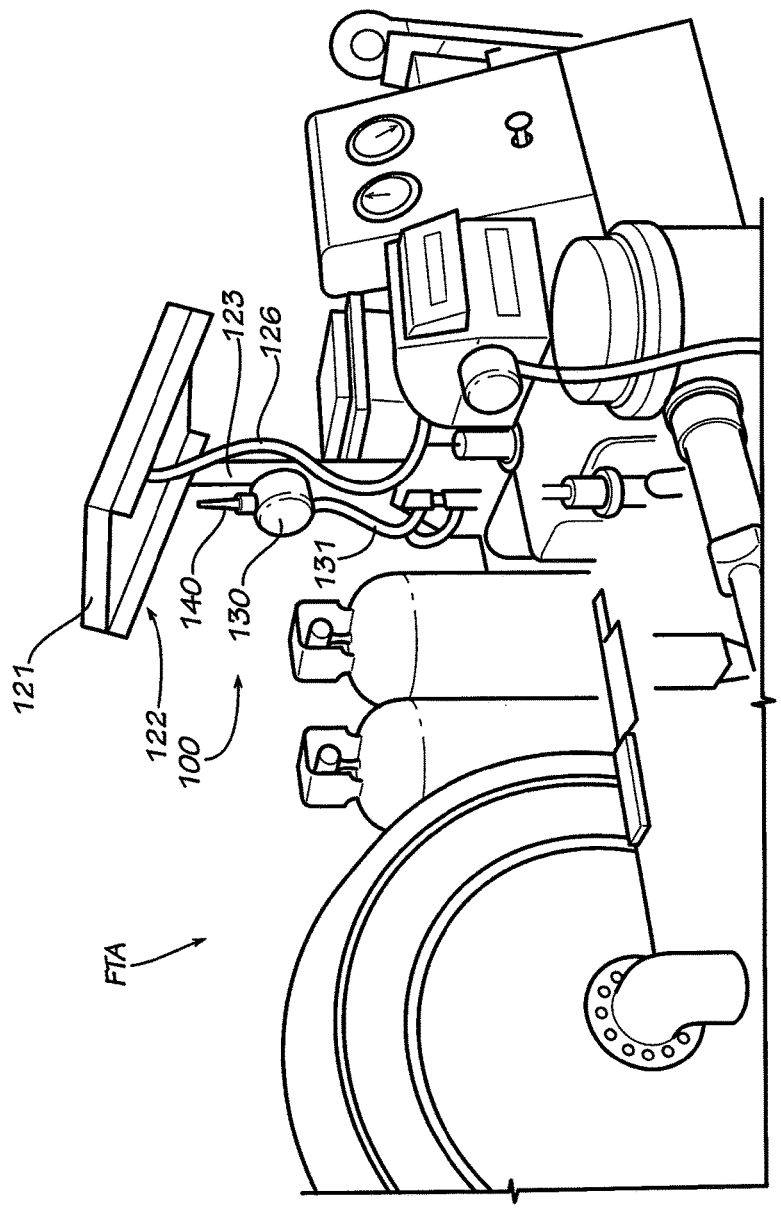
FIG. 4 is a perspective illustration of an example of a battery-powered fueling data collection unit of FIG. 3 mounted on a fuel cart.
Figure 13A:
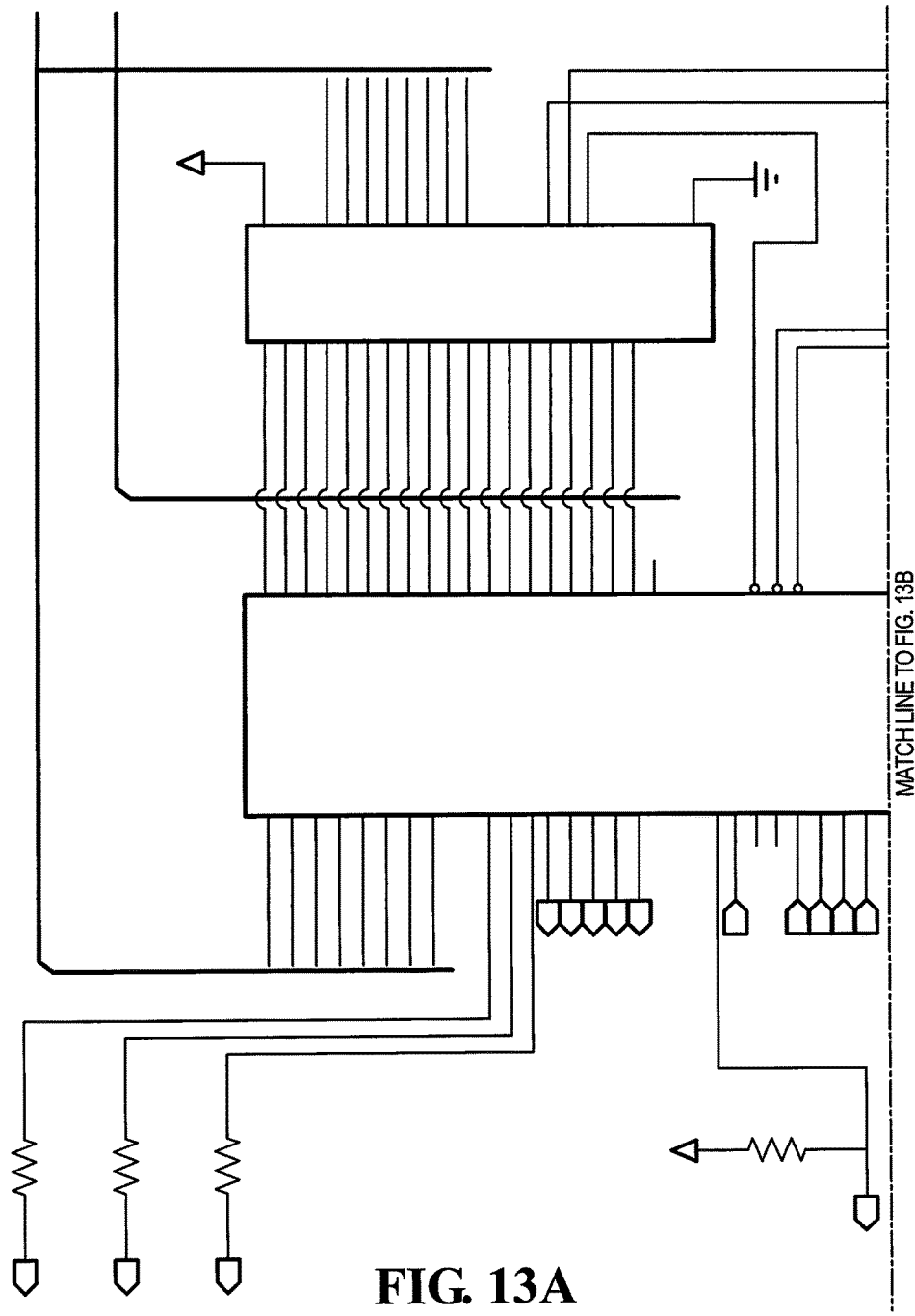
Figure 13B:
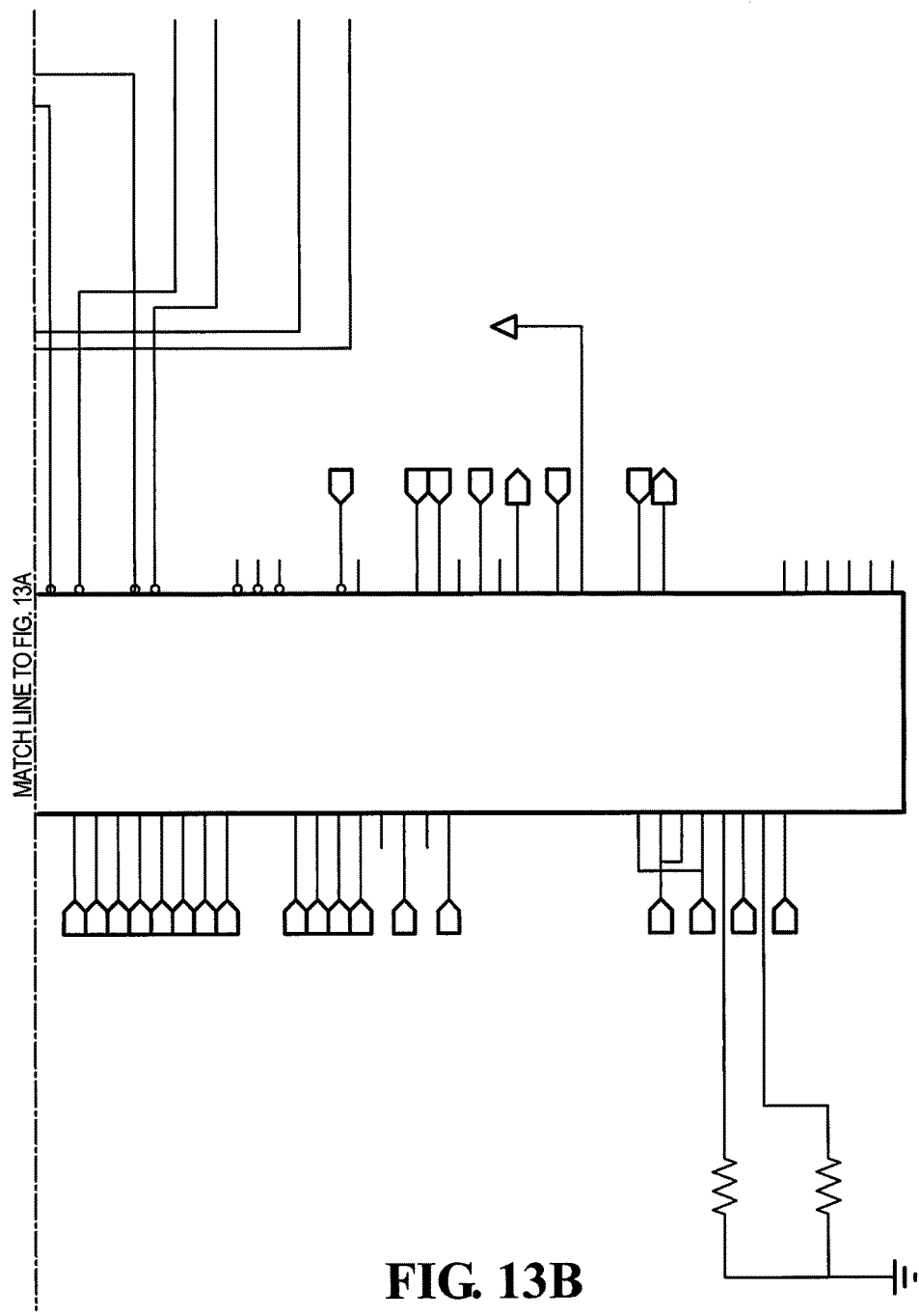

FIGS. 13A and 13B together are a schematic block diagram of an example implementation of a microprocessor and memory for use in the battery-powered fueling data collection unit of FIG. 4, with FIGS. 13A and 13B collectively referred to herein as FIG. 13.

Figure 14:
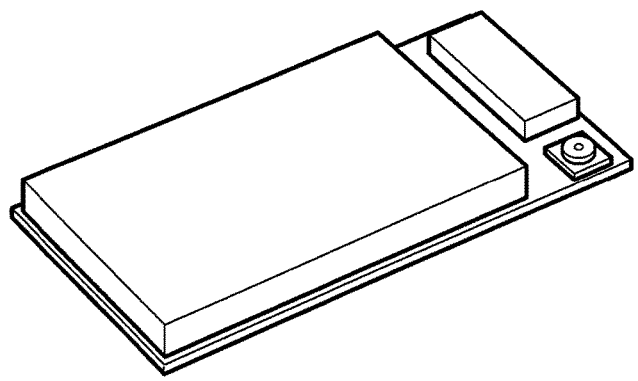

FIG. 14 is a schematic illustration of an example Wi-Fi communications device for use in the battery-powered fueling data collection unit of FIG. 4.

Figure 15:
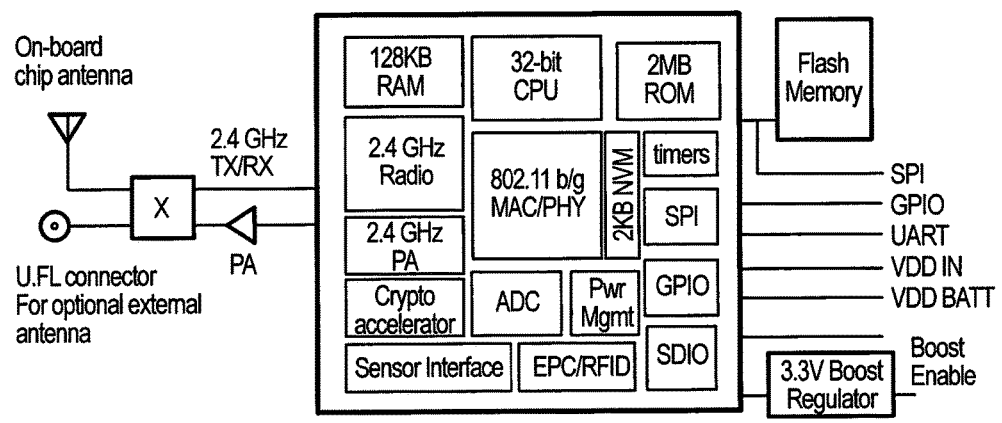

FIG. 15 is a schematic block diagram of the example Wi-Fi communications device of FIG. 14.

Figure 16:
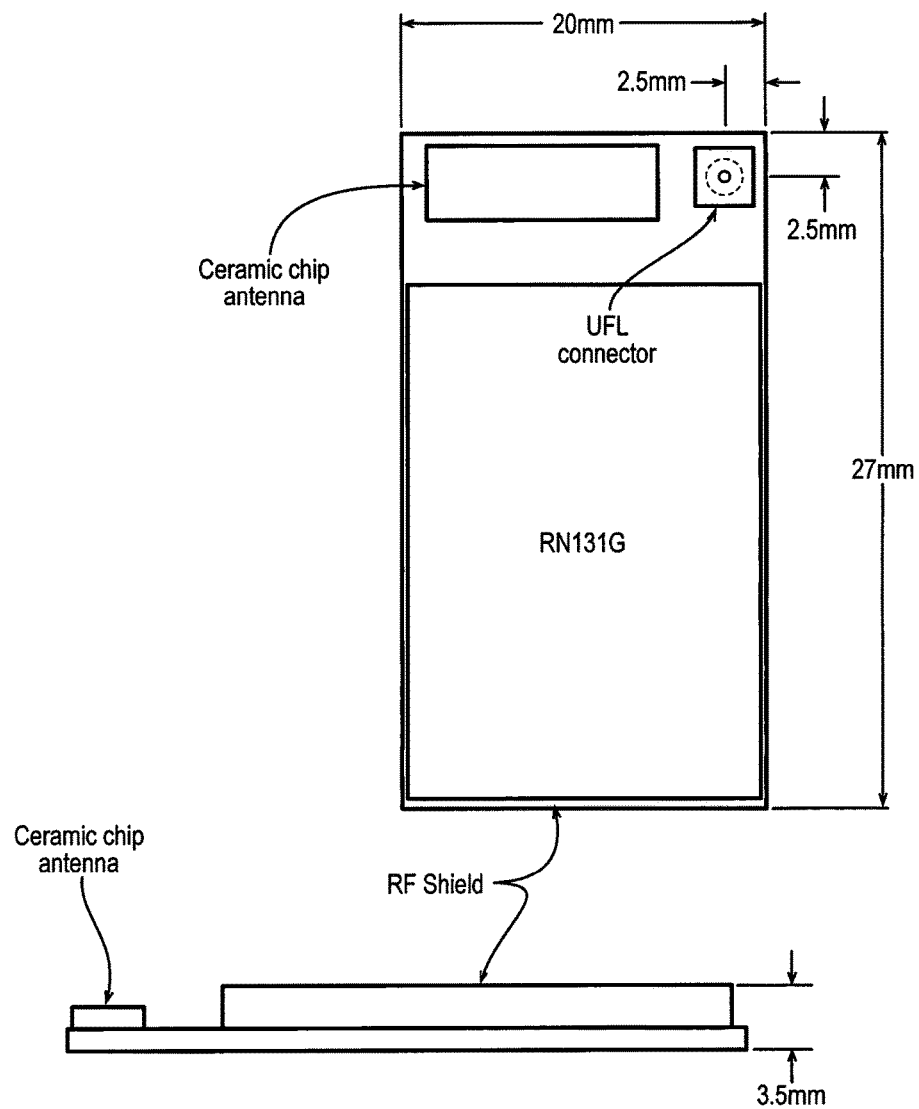

FIG. 16 is a schematic form-factors diagram of the example Wi-Fi communications device of FIG. 14.

Figure 17:
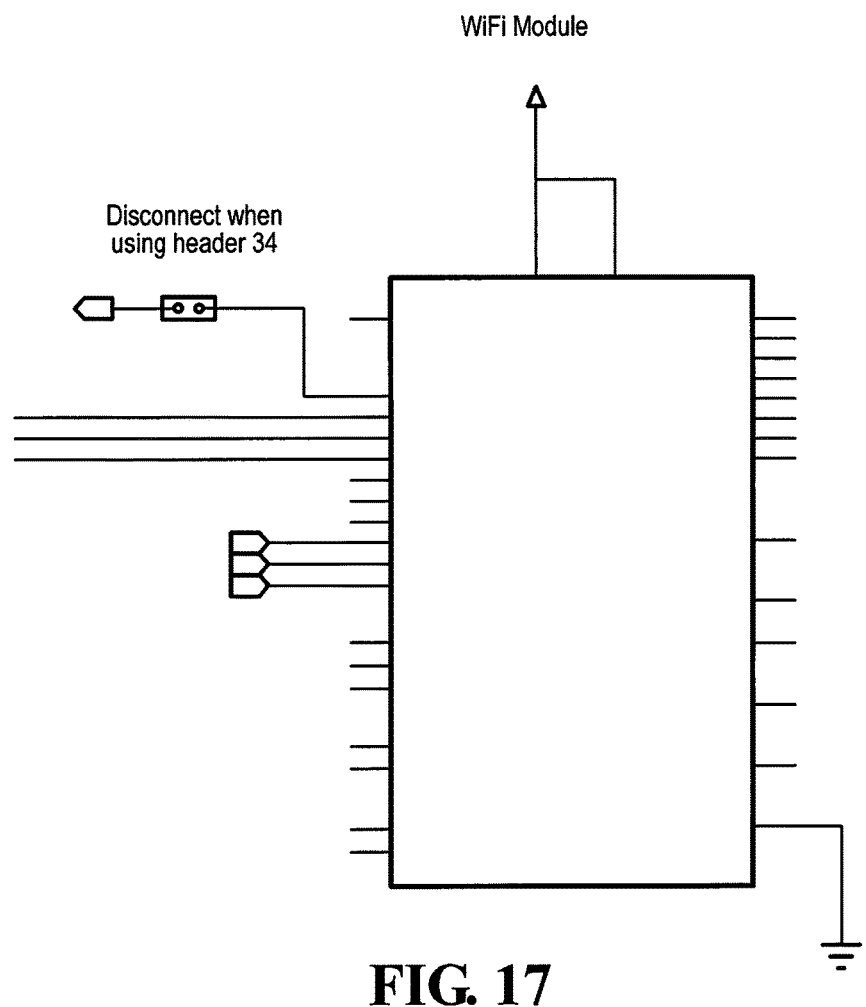

FIG. 17 is a schematic diagram of an example interface of the microprocessor to the Wi-Fi communications device.

Figure 18:
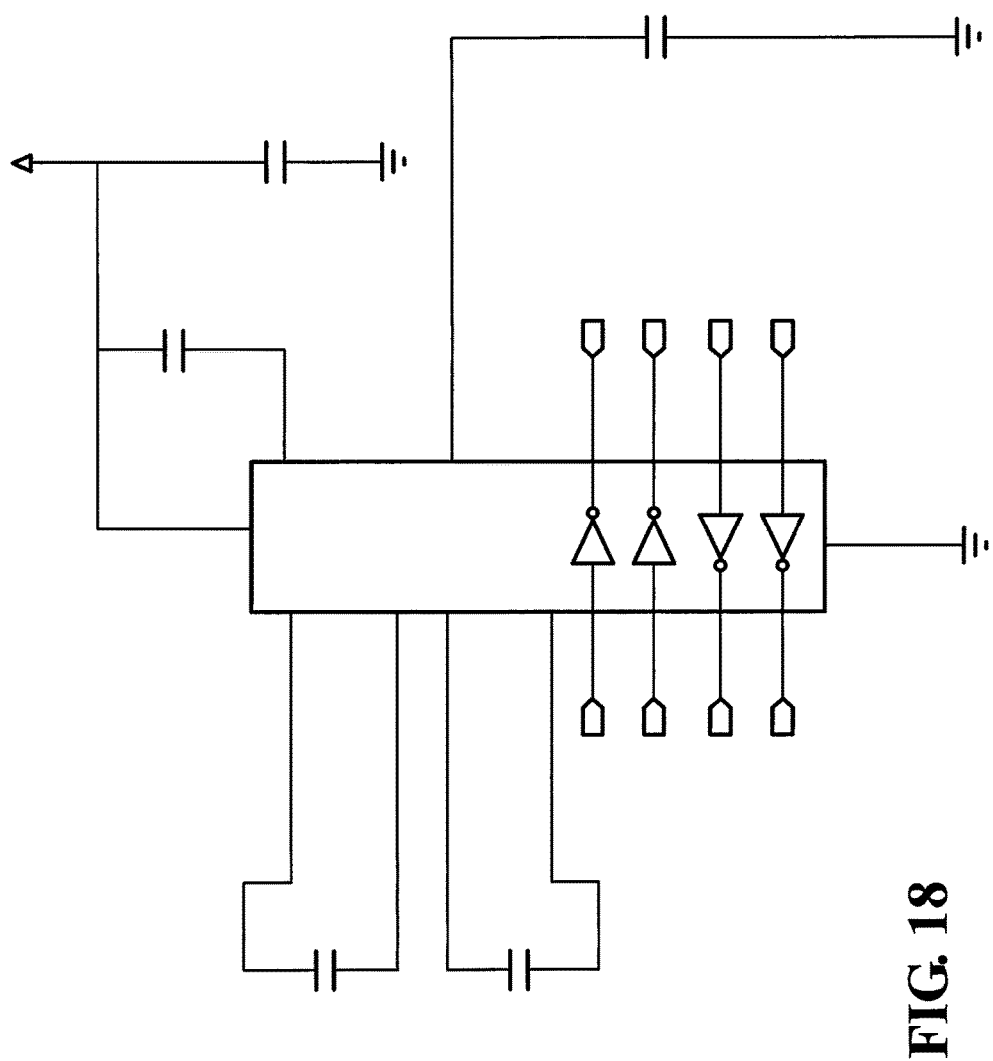

FIG. 18 is a schematic diagram of an example serial communication module for use in the battery-powered fueling data collection unit of FIG. 4.

Figure 19:
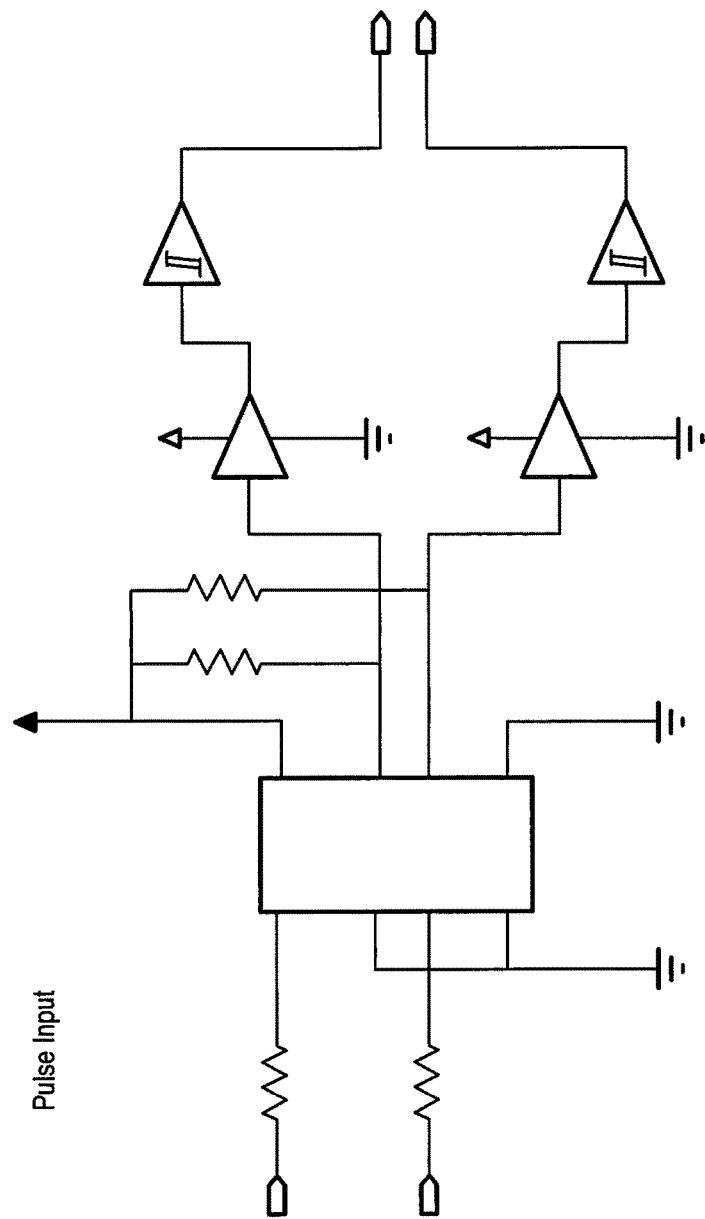

FIG. 19 is a schematic diagram of an example pulse input module for use in the battery-powered fueling data collection unit of FIG. 4.

Figure 20:
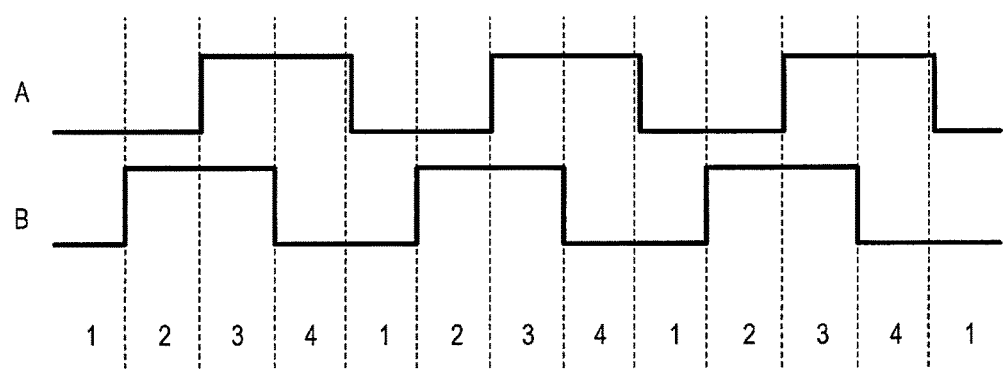

FIG. 20 is a plot of an example quadrature-encoded signal for use in the battery-powered fueling data collection unit of FIG. 4.

Figure 21:
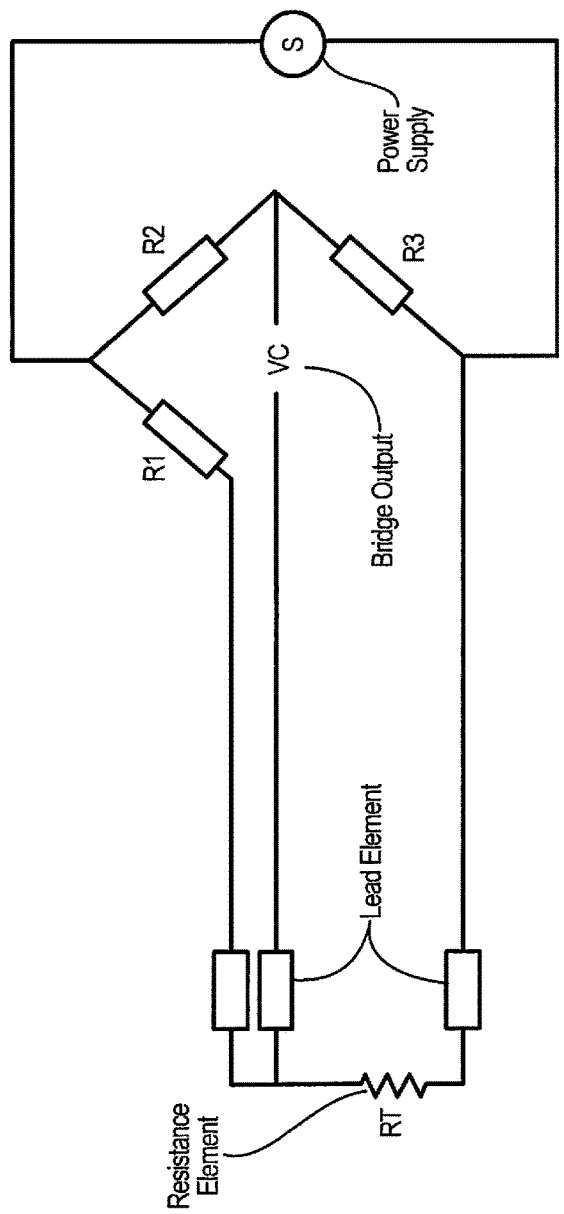

FIG. 21 is a schematic diagram of an example resistance temperature detector module for sensing temperature and for use in the battery-powered fueling data collection unit of FIG. 4 to calculate the density of the fuel and calculate the exact amount of fuel dispensed at standard temperature.

Figure 22A:
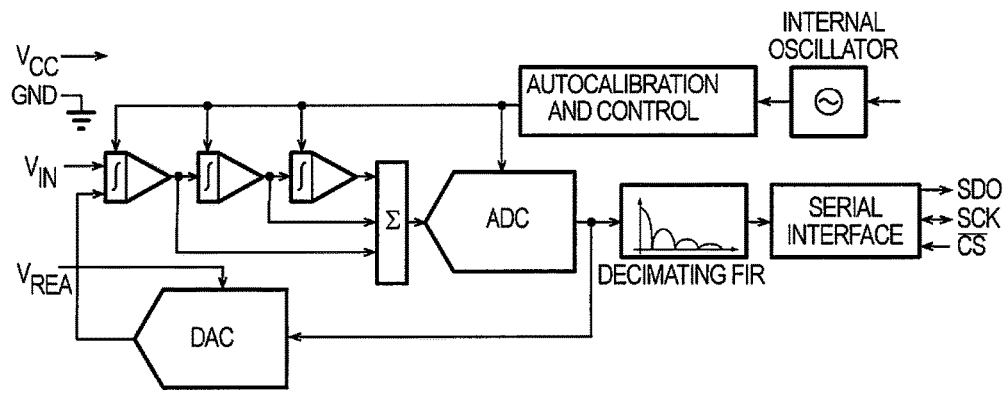
Figure 22B:
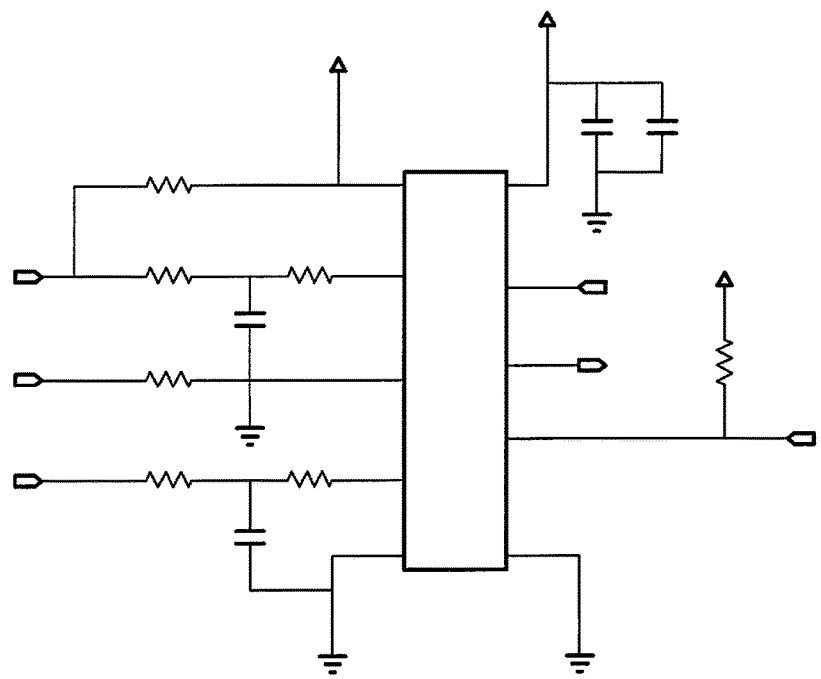

FIGS. 22A and 22B are schematic diagrams of the example resistance temperature detector module of FIG. 21.

FIG. 23 is an example pin out table of power, I/O, and serial communications for the example processor for use in the battery-powered fueling data collection unit of FIG. 4.

Figure 24:
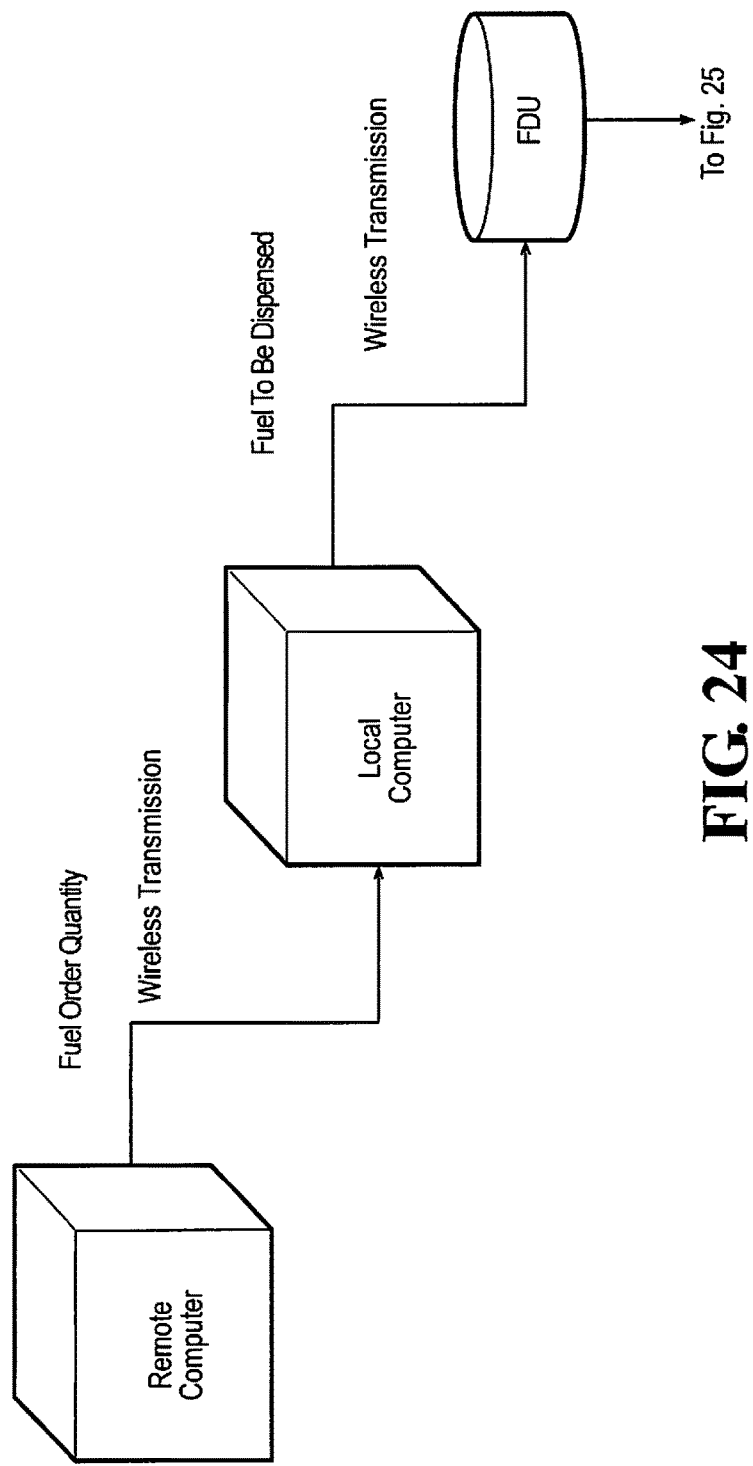

FIG. 24 is a schematic illustration of the operation of the fueling data of FIG. 4.

Figure 25:
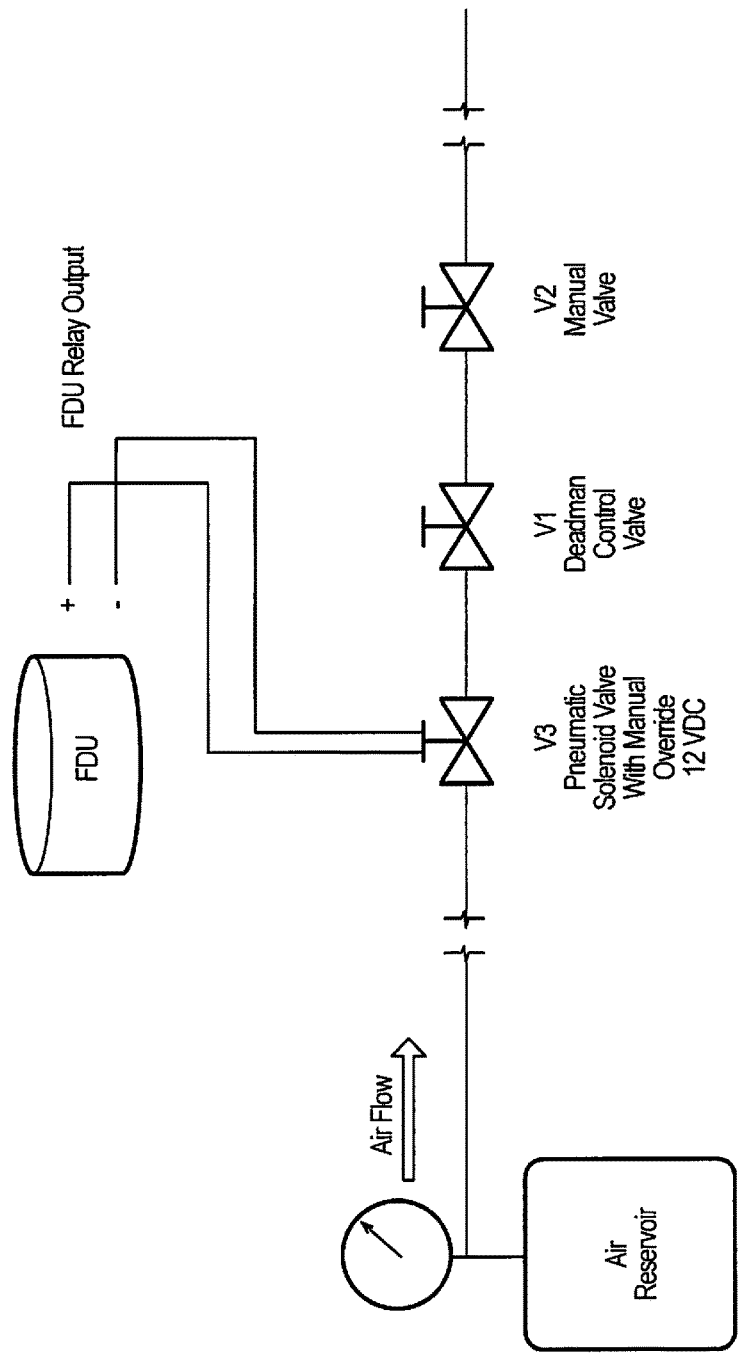

FIG. 25 is a schematic illustration of the operation of the fueling data of FIG. 4.

DETAILED DESCRIPTION

Figure 1:
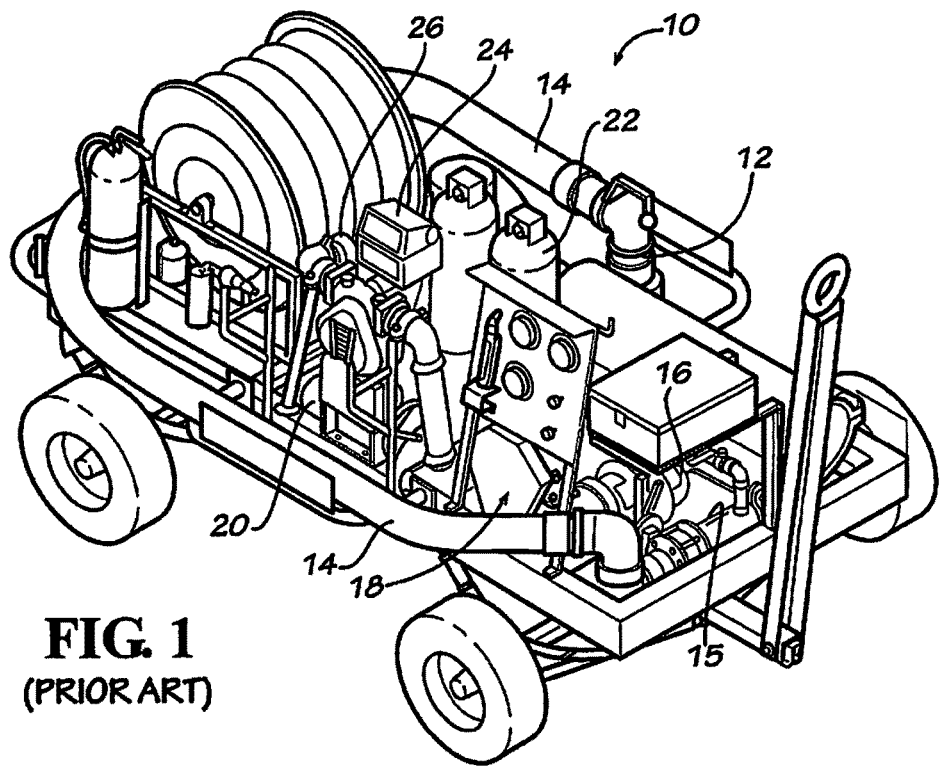
Figure 2:
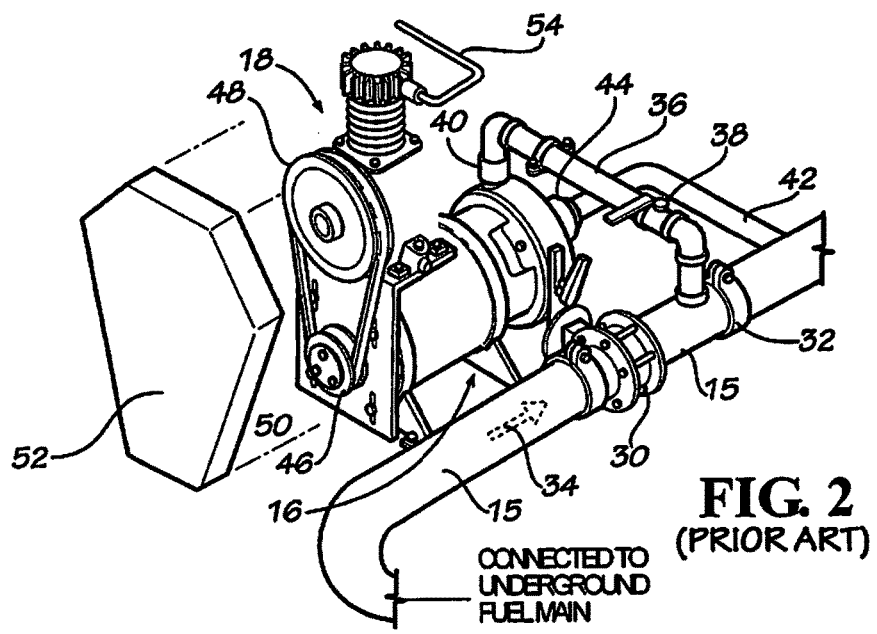

Turning now to the drawing figures, wherein like reference numerals represent like parts throughout the several views, FIGS. 1 and 2 depict a prior art fuel cart for pumping fuel from a truck or underground lines into an aircraft and such is generally shown and described in U.S. Pat. No. 5,609,027. The present invention can be used with such a fuel cart, as well as other fueling apparatuses. As shown in FIG. 1, such a prior art refueling cart 10 is generally illustrated. Such refueling carts are generally wheeled and are pulled about from one loading/unloading apron to another around the airport, as needed to refuel airplanes.

When conveniently positioned on an apron, a hydrant coupler 12 is removed from the refueling cart 10 and is connected to a pressurized refueling hydrant (not shown) at the apron. Airplane fuel under substantial pressure is available at the refueling hydrant. The hydrant coupler 12 is connected to one end of a flexible hose 14 that conveys the fuel from the hydrant to the piping and apparatus of the refueling cart. When the refueling cart is being transported from one apron to another, the flexible hose 14 is stored compactly (as illustrated in FIG. 1) about the refueling cart 10.

The fuel from the flexible hose 14 first flows through an inlet pipe 15 having a variable orifice. A source bypass pipe (more fully described below in connection with a fluid motor, a sink bypass pipe, and an air compressor, all in connection with FIG. 2) carries some of the fuel from upstream of the variable orifice to the input of a fluid motor 16. A sink bypass pipe carries the fuel from the output of the fluid motor back to the inlet pipe 15 but downstream of the variable orifice. In this way, the pressurized fuel that bypasses the variable orifice drives the fluid motor 16.

The flow of fuel through the variable orifice and to the airplane generates a pressure difference across the variable orifice. That pressure difference drives the bypass fuel around the orifice, through the source and sink bypass pipes, and through the fluid motor 16 to drive the output shaft of the fluid motor. The output of the fluid motor 16 drives an air compressor 18 to compress air for delivery to a compressed-air tank or reservoir 20.

The fuel also passes through or is carried past the other conventional components of the refueling cart 10, such as a pressure surge suppressor 22, a fuel quantity meter or register 24, and various control valves 26, to the rotating, sealed input of a hose reel. A fueling nozzle (not shown) on the outer end of the reeled length of hose is attached to the fuel input connectors of the airplane (not shown).

Referring now to FIG. 2, the fuel inlet pipe 15 has a shut-off valve 30 to help prevent spillage. A source bypass pipe 36 extends from the inlet pipe 15 and carries fuel from the inlet pipe upstream of the variable orifice that is inside the inlet pipe in the region of the coupling 32. There is a shut-off valve in the source bypass pipe 36. The other end of the source bypass pipe 36 is connected to the fluid input 40 of the fluid motor 16. A sink bypass pipe 42 conveys fuel from the fluid outlet 44 of the fluid motor back to the inlet pipe 15, but downstream of the variable orifice.

The drive pulley 46 rotates a driven pulley 48 by means of a drive belt 50. The driven pulley 48 is connected to the drive shaft of the air compressor 18, an auxiliary instrumentality on the refueling cart, for utilizing the mechanical output power of the fluid motor 16. A protective pulley cover 52 (shown exploded from the pulleys 46 and 48 in FIG. 2) partially obscures the compressor 18 in the view of the refueling cart 10 depicted in FIG. 1. The air compressor 18 is conventional and is commercially available.

An exemplary battery-powered fueling data collection unit or Fuel Data Unit (FDU) 100 is shown in FIGS. 3-5D and operates as an automatic data capture (ADC) unit. Preferably, the battery-powered fueling data collection unit 100 is for use with a meter and a register associated with a fuel transfer apparatus FTA and for use with a system for managing fueling transactions of a fleet operator using fuel transfer apparatuses at multiple locations. The fueling data collection unit includes a fueling data interface module for receiving fueling information from the fueling meter and/or register. The fueling data collection unit also includes an internal battery power source 110. A processor is provided for monitoring the power level in the battery and for detecting if the power level in the battery drops below a threshold amount. Also, a communications module is provided for wirelessly forwarding an alert to a remote computer to alert the remote computer that the battery power is low. The power monitoring circuit uses the Texas Instruments INA219 bi-directional current and power monitor. The device is a high-side current shunt and power monitor with an $I^2C$ interface. It monitors both shunt drop and supply voltage with programmable conversion times, filtering and calibration value. Combined with an internal multiplier, it enables a direct readout to in amperes and/or in watts. Alternatively, the main microprocessor could be provided with programming to perform this function.

Optionally, the battery-powered fueling data collection unit 100 can include a solar-powered battery charger 120 for charging the battery 110. Alternatively, the unit's battery 110 can be recharged by an external battery charger, such as an alternator or generator on the fueling apparatus.

Optionally, the battery-powered fueling data collection unit communicates wirelessly with a local hand-held computer device HH. To facilitate this wireless communication the data collection unit 100 includes a housing 130 with a wireless antenna 140 mounted thereon. In one form, it does so to wirelessly forward an alert to a remote computer via a local computing device to alert the remote computer that the battery power is low. The communications module can initiate the communications via cellular, Wi-Fi, Bluetooth, etc. In a preferred form, the direct readout from the processor in amperes is sent via the communications protocol used for the metered fuel volume data to the local computing device. The computing device includes configurable programmatic settings for the low power alert and warning levels that are forwarded to a remote and/or supervisory computing device.

Preferably, the battery-powered fueling data collection unit 100 includes input ports to allow it to be coupled with an electronic register ER or a mechanical register MR with a pulse counter.

The example battery-powered fueling data collection unit 100 depicted in the drawings is adapted and configured in this instance for installation on aircraft fueling equipment to collect real-time, fueling quantity (mass and volume) data. The FDU 100 includes a high-speed wireless data link 141 to a handheld computer HH or enclosed computing device that transmits fuel and aircraft data to a remote Data Center.

Figure 3:
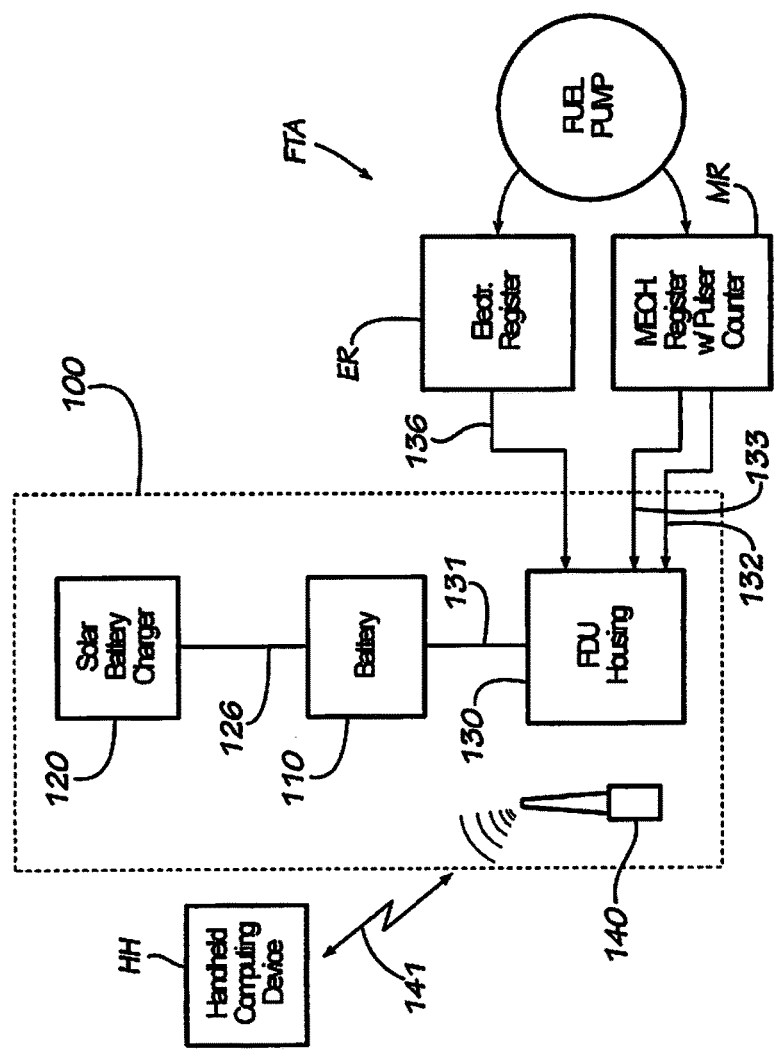

As shown in FIG. 3, it can be used with mechanical or electronic meter registers. As presently contemplated, there are primary two options for transmitting data: wireless (IEEE 802.11 b/g (Wi-Fi), Bluetooth, Cellular) or RS-232. The wireless (Wi-Fi, Bluetooth or Cellular) is used to communicate with the HH, while the RS232 communications link is for communicating with an enclosed computing device, as in when the computing device is mounted on a cart or truck. In addition, the fuel data is archived in a nonvolatile memory for retrieval as a data backup. The FDU electronics are mounted in an explosion-proof housing 130 that is equipped with a sealed, explosion-proof antenna feed-thru and an external antenna 140.

Two (2) pulse input channels 131, 132 are provided for interfacing to pulse transmitters attached to mechanical registers. These pulse totalizer inputs convert flow measurement signals to fuel mass and volume information. A serial port (RS-232) 136 can be used for data collection from electronic metering instrumentation and for a terminal interface used for system debug and configuration settings.

Additionally, there is an RTD (Pt-100) input to allow real-time calculation of mass and net volume dispensed into the aircraft. Other Input/Output (I/O) circuits include a discrete output which can provide fueling operation shutoff via a control valve.

The FDU sends metered volume data to an enclosed or handheld computing device via Wi-Fi communications. A simple configuration process is all that is needed for the FDU to emulate a de facto meter register industry standard. Other protocols are optionally available.

Figure 5A:
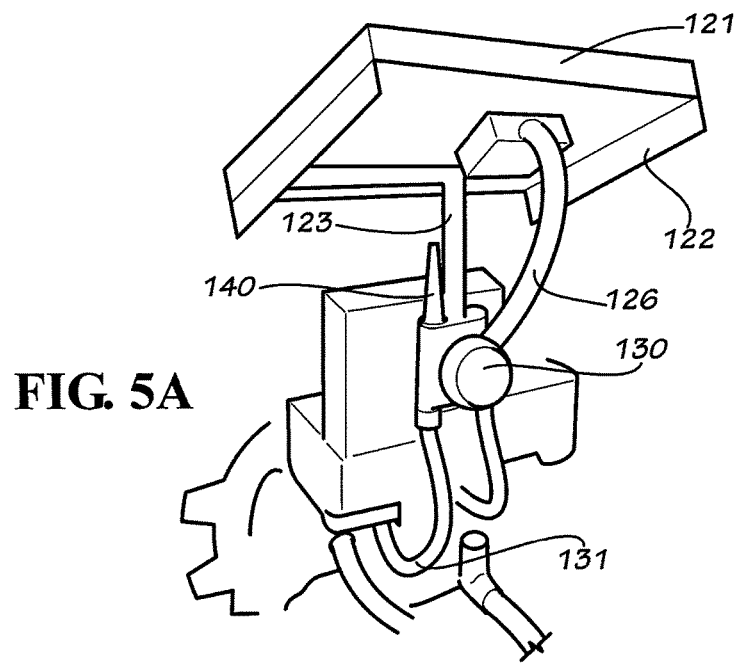
FIGS. 5A and 5B are additional perspective views of the battery-powered fueling data collection unit of FIG. 4.
Figure 5B:
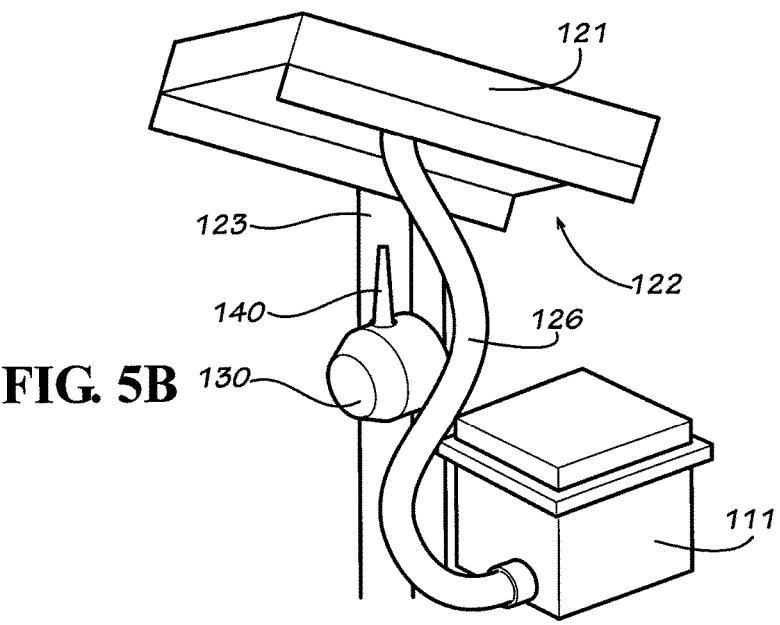

As shown in FIGS. 4-5B, the FDU 100 can be mounted on the FTA and includes a pedestal-mounted battery charger 120. As shown, the battery charger is a solar battery charger and includes a solar collector assembly 121, a support frame 122, and a pedestal 123. The support frame 122 is connected to the pedestal 123 with ball and socket style mount to allow movement of the solar panel in any direction to maximize solar power collection at any location. The pedestal 123 is mounted to the structure of the FTA to support the solar collector 121.

The FDU's housing 130 is a generally cylindrical unit and is mounted to the pedestal 123. The housing 130 supports the antenna 140.

The solar charger 120 is electrically coupled to the battery 110 and includes intelligent circuitry for managing the power level in the battery 110. In this regard, an electrical conduit 126 extends from the battery charger 120 to a battery box 111 (which houses the battery 110). The conduit 126 encloses an unshown electrical cabling to electrically couple the battery with the charger. A similar conduit 131 extends from the FDU housing 130 to the battery box to carry electrical cable therebetween to electrically couple the battery and the FDU housing together.

Figure 5C:
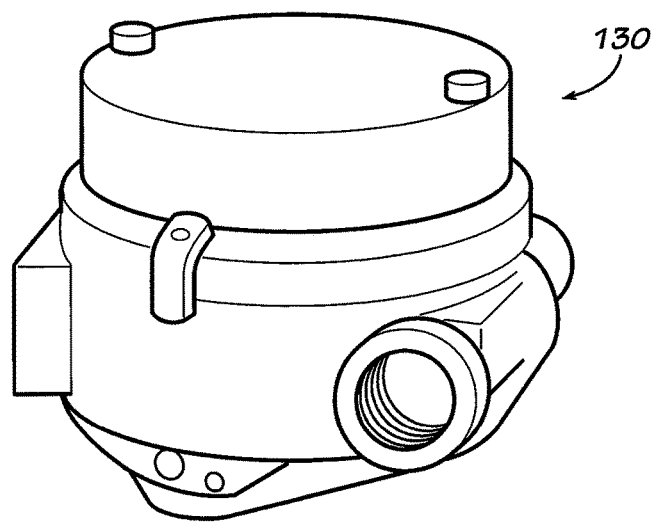
FIG. 5C is a perspective view of a housing portion of the battery-powered fueling data collection unit of FIG. 4.

FIG. 5C is a perspective view of a housing portion of the battery-powered fueling data collection unit of FIG. 4. This is a commercially available explosion-proof housing cast from copper-free aluminum alloy with offset feed-through conduit openings and an "X" configured interior mounting pad for electronic devices cast into the bottom of the housing.

Figure 5D:
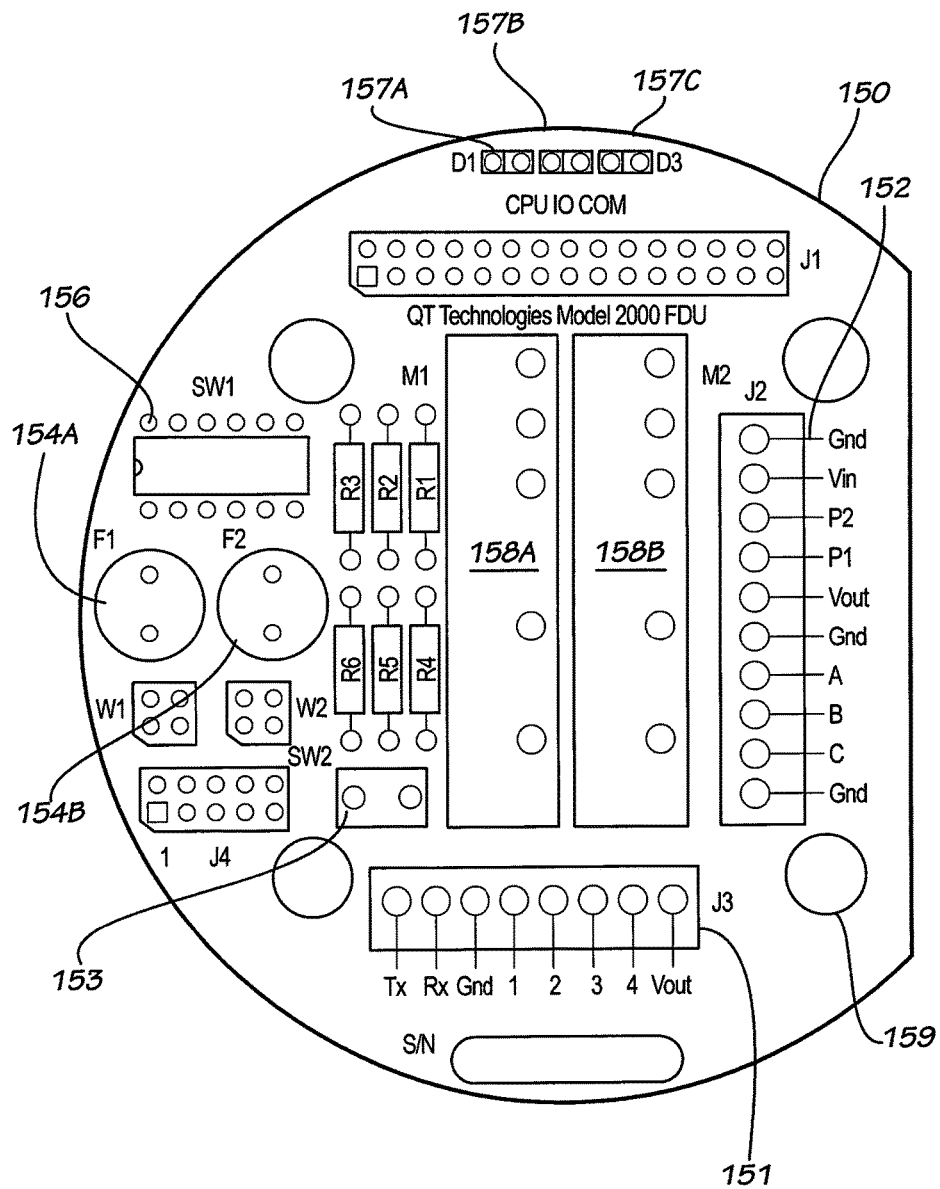
FIG. 5D is a perspective view of a housing portion of the battery-powered fueling data collection unit of FIG. 4, shown with a cover portion thereof removed and showing an electronics board mounted therein.

FIG. 5D is a perspective view of a housing portion of the battery-powered fueling data collection unit of FIG. 4, shown with a cover portion thereof removed and showing an electronics board 150 mounted therein. There are two pluggable terminal blocks 151, 152 for communications, grounding, digital inputs and outputs. A reset switch 153 is to the left of the terminal block. Above that are two 1-Amp fuses 154A, 154B. A set of dipswitches 156 is for configuration and diagnostics. Three LED lights 157A-157C indicate the status of the CPU, the I/O and the communications. At the center are two relays 158A, 158B. There are four mounting screw holes to keep the board systems in place within the housing, such as mounting screw 159. The FDU and the fueling apparatus operate in conditions that could harm the electronics if they are not securely attached to the housing.

In particular, FIG. 5D shows two terminal blocks 151, 152 for securely connecting the wires from the communications cables, serial inputs and outputs, power and other internal connections. The reset switch 153 toggles the reset line to the microprocessor, initiating a full restart of the on-board programming and communications. Two 1-amp fuses 154A, 154B protect the on-board electronics from inbound power from the battery system and outbound power to the mechanical or electronic pulser. A set of dip switches 156 is used to put the on-board electronics into various diagnostic and configuration modes. Three LED lights 157A-157C show the status of the main subsystems of the FDU. The CPU LED is a heartbeat signal from the microprocessor, indicating normal operation. The IO LED toggles under two situations—when the A/D converter reads the value of the temperature measurement device (RTD) and when pulses are detected from the pulser. The COM LED flashes when there are communications to and from the local computing device. The two relays 158A, 158B can be used to control any number of devices. This can include sending a signal to a solenoid valve(s) for automatic shutoff of fuel flow at a pre-set amount of fuel.

Figure 6:
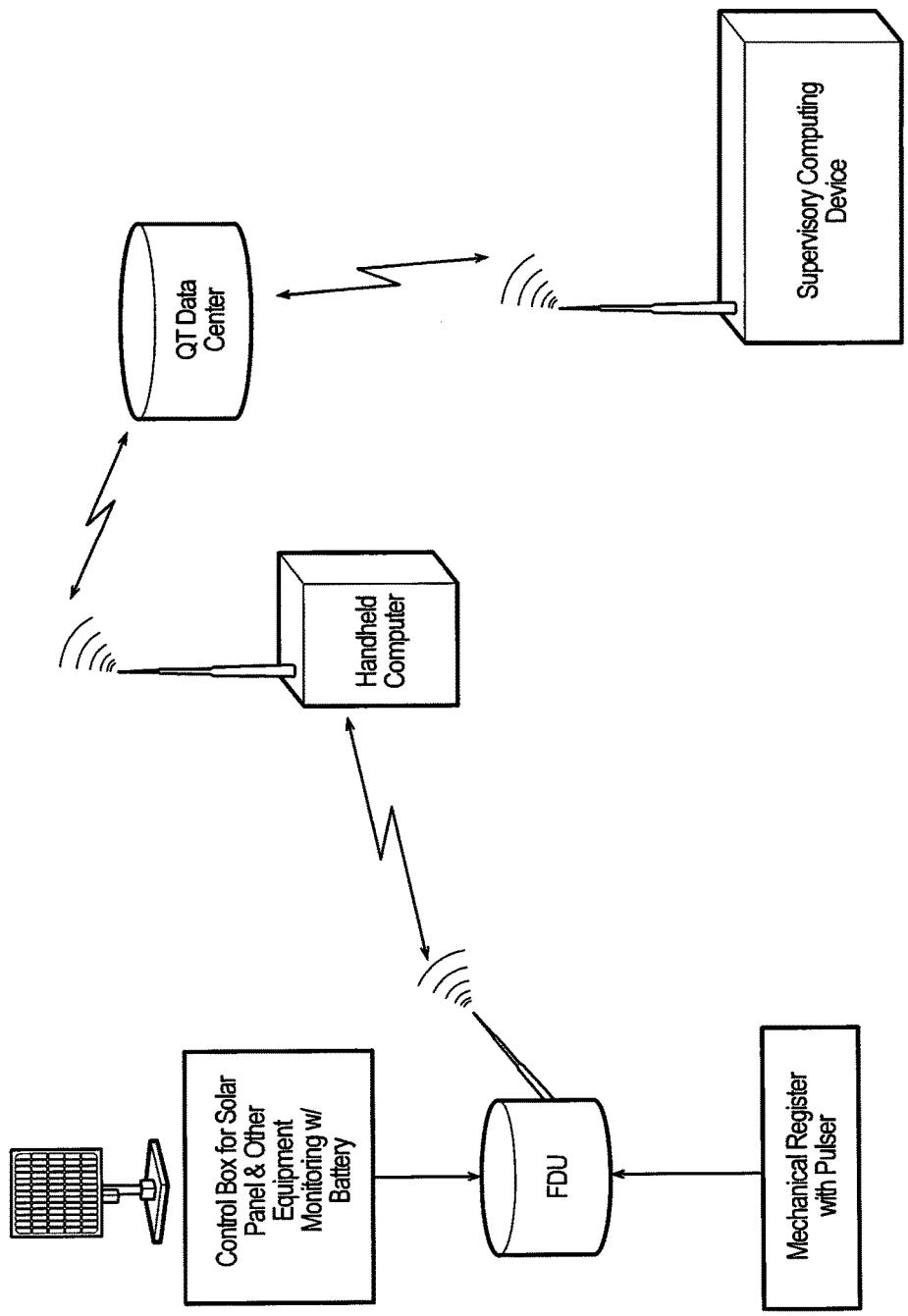
FIG. 6 is a schematic illustration of a battery-powered fueling data collection unit of FIG. 4 in a no-power environment and coupled to a mechanical fuel register.
Figure 7:
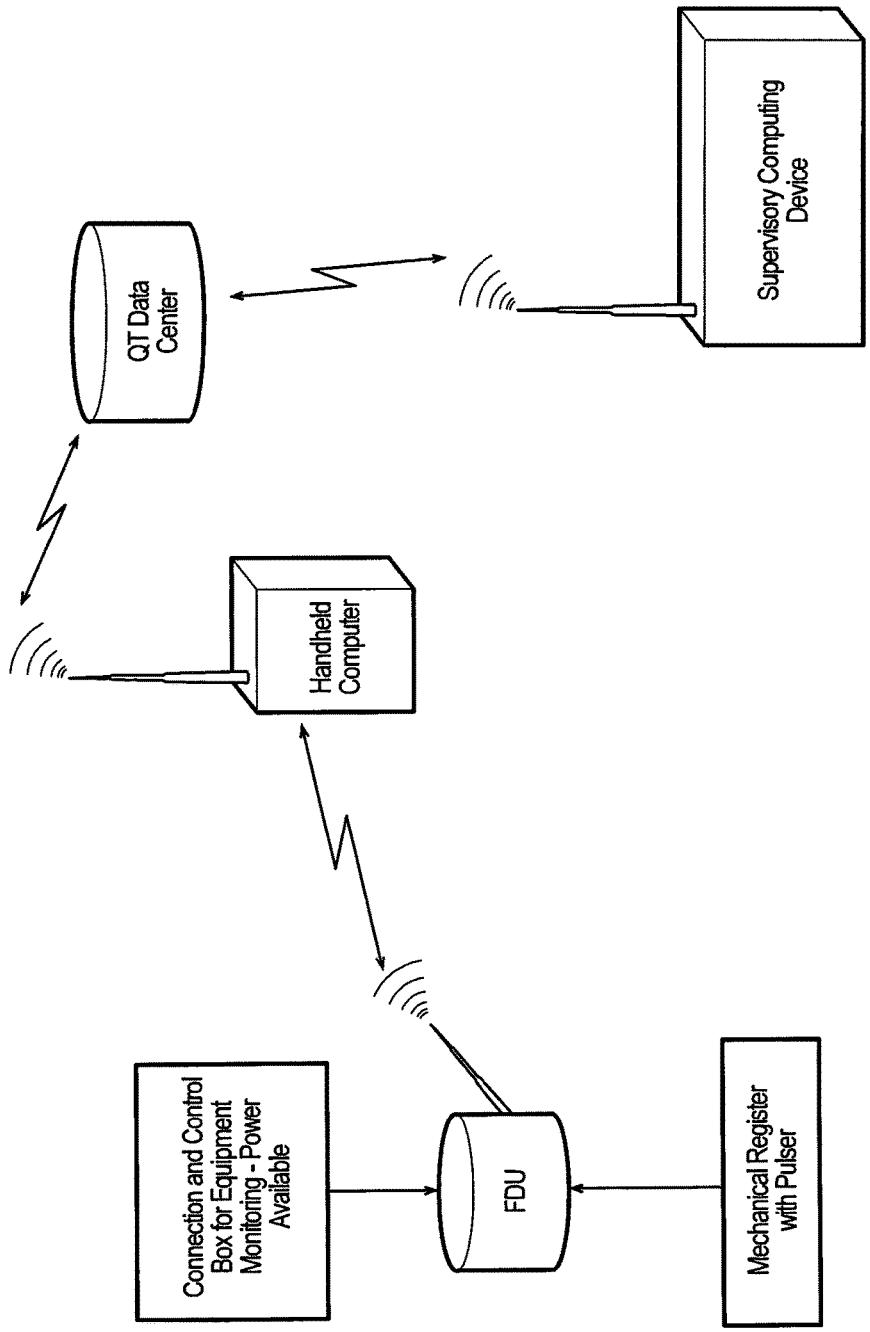
FIG. 7 is a schematic illustration of a battery-powered fueling data collection unit of FIG. 4 in a power-available environment and coupled to a mechanical fuel register.
Figure 8:
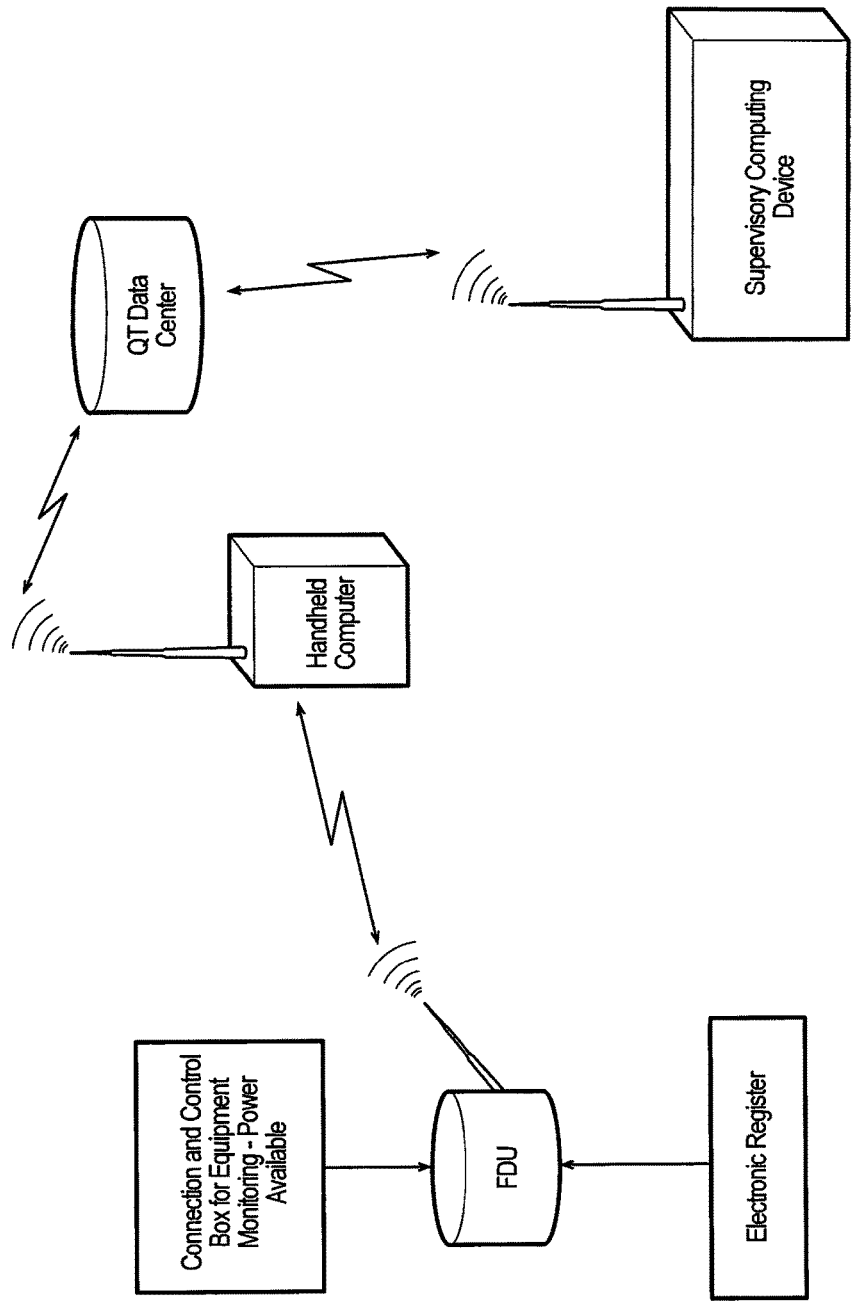
FIG. 8 is a schematic illustration of a battery-powered fueling data collection unit of FIG. 4 in a power-available environment and coupled to an electronic fuel register.
Figure 9:
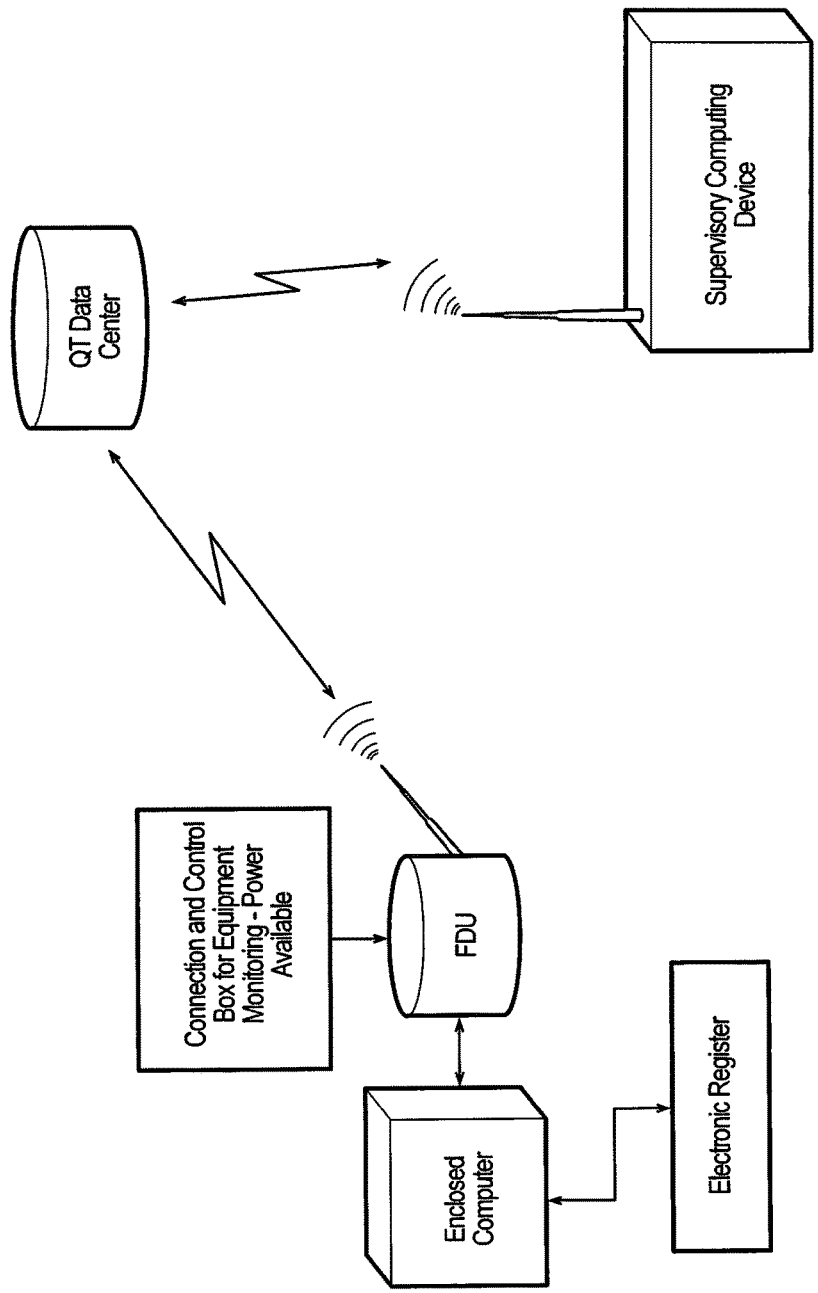
FIG. 9 is a schematic illustration of a battery-powered fueling data collection unit of FIG. 4 in a power-available environment with an enclosed computer and coupled to an electronic fuel register.
Figure 10:
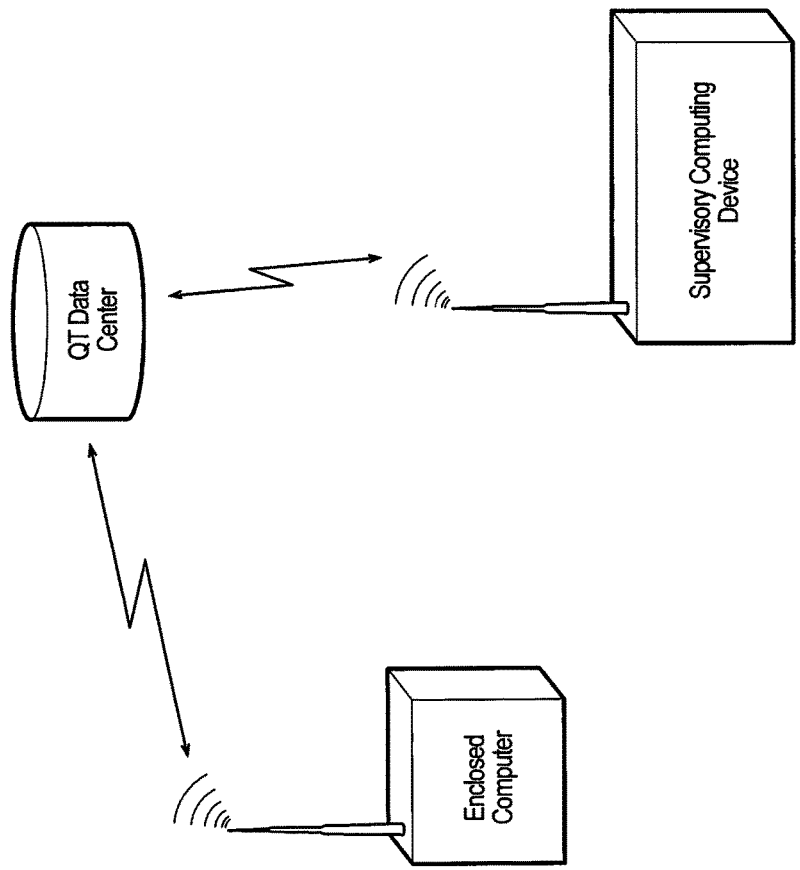
FIG. 10 is a schematic illustration of a battery-powered fueling data collection unit of FIG. 4 in a power-available environment with an enclosed computer and coupled to an electronic fuel register, and using wireless communication.
Figure 10:
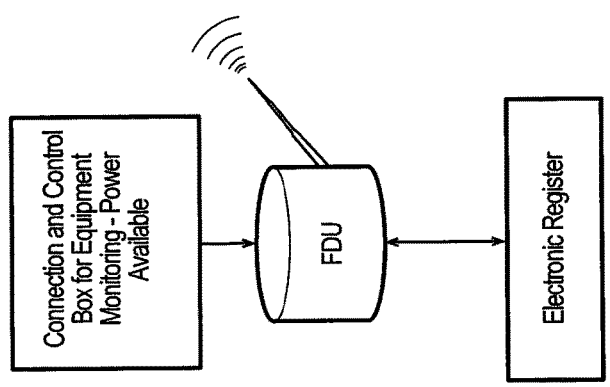
Figure 11:
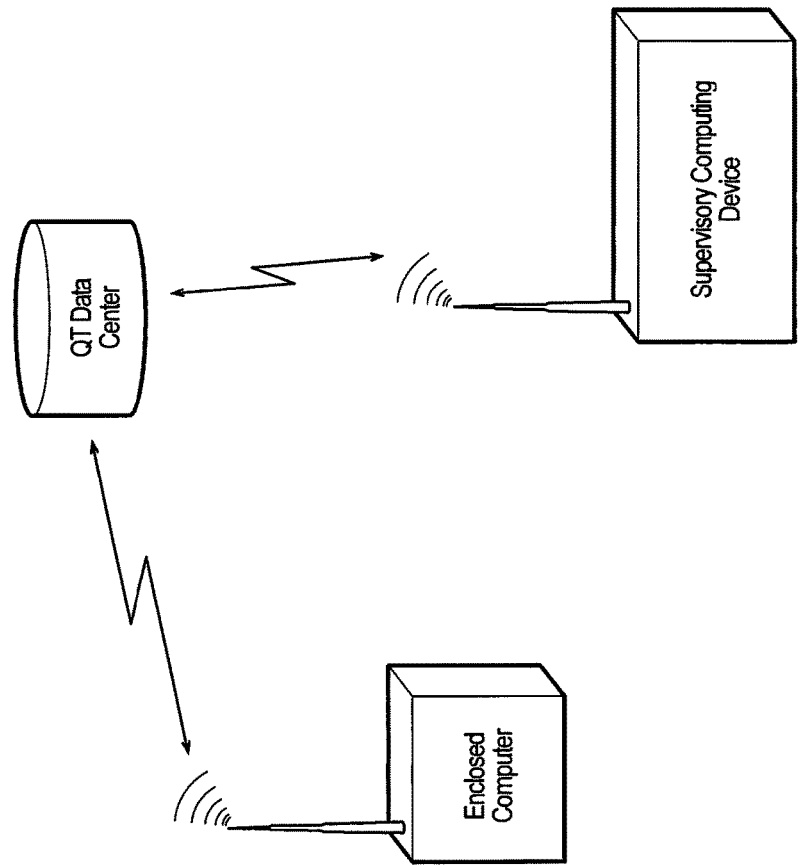
FIG. 11 is a schematic illustration of a battery-powered fueling data collection unit of FIG. 4 in a no-power environment with an enclosed computer and coupled to an electronic fuel register, and using wireless communication.
Figure 11:
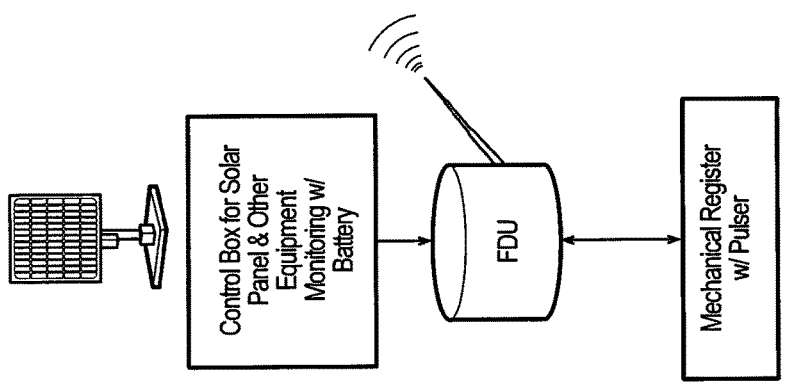

FIGS. 6-11 depict various configurations for using the FDU and indicate how fueling and equipment status data is relayed from the field devices to the QT Data Center to a supervisory computer for action on a maintenance or power source issue. FIG. 6 shows the configuration of an unpowered location with a mechanical register and pulser where a solar panel is used to charge the battery and a handheld computer is the local computing device receiving data wirelessly via Wi-Fi, Bluetooth or cellular signals. FIG. 7 shows the configuration of a powered location such as a truck with a mechanical register and pulser where the truck battery is used as the source of power and a handheld computer is the local computing device receiving data wirelessly via Wi-Fi, Bluetooth or cellular signals. FIG. 8 shows the configuration of a powered location such as a truck with an electronic register where the truck battery is used as a power source and a handheld computer is the local computing device receiving data wirelessly via Wi-Fi, Bluetooth or cellular signals. Communications between the FDU and the electronic register in this configuration is via an RS-232 serial cable. FIG. 9 shows the configuration of a powered location such as a truck with an electronic register where the truck battery is used as a power source and an enclosed computer is used as the local computing device. Communications between the electronic register, the enclosed computer and the FDU are all via RS-232 serial cables. FIG. 10 shows the configuration of a powered location such as a truck with an electronic register where the truck battery is used as a power source and an enclosed computer is used as the local computing device receiving data wirelessly via Wi-Fi, Bluetooth or cellular signals. Communications between the electronic register and the FDU are via an RS-232 serial cable. FIG. 11 shows the configuration of an unpowered location with a mechanical register and pulser where a solar panel is used to charge the battery and an enclosed computer is the local computing device receiving data wirelessly via Wi-Fi, Bluetooth or cellular signals.

Figure 12:
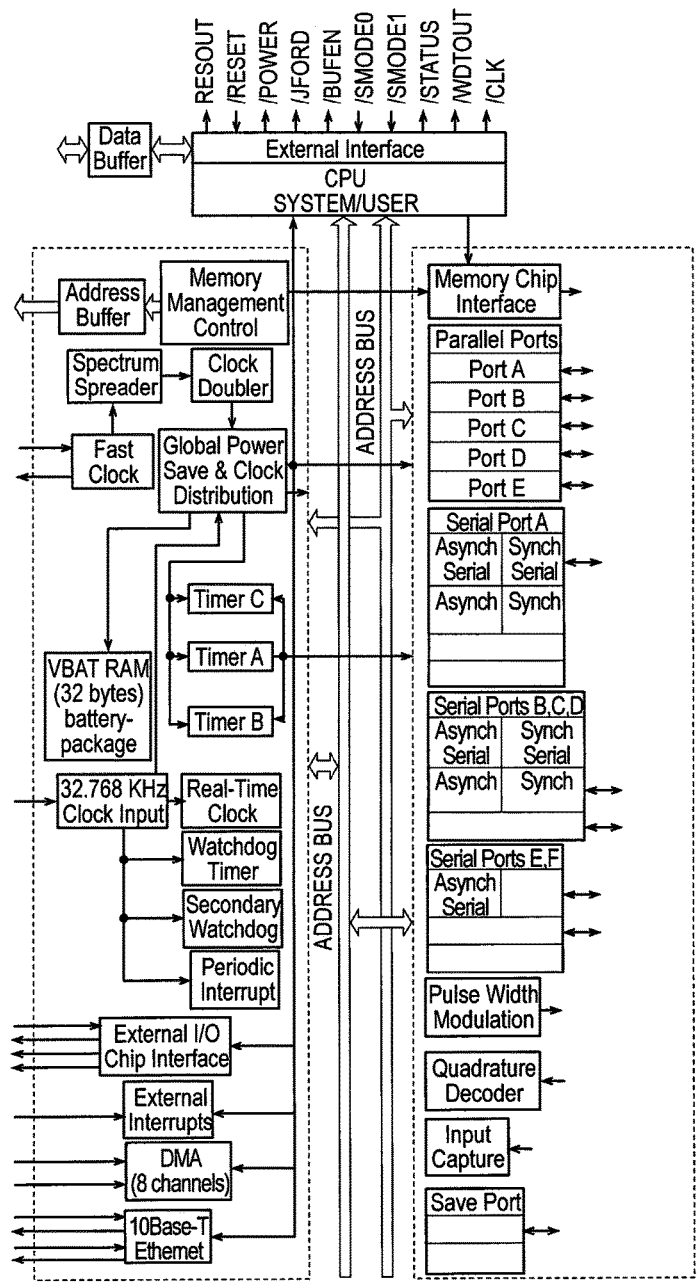
FIG. 12 is a schematic block diagram of an example processor for use in the battery-powered fueling data collection unit of FIG. 4.

The FDU 100 can use any of a number of commercially-available microprocessors. One such microprocessor that is well suited to the task is known as a "Rabbit 4000" from Rabbit, Inc, a Digi International company. It is a high-performance, low-EMI microprocessor designed for embedded control applications and has an 8-bit architecture that operates at frequencies up to 60 MHz. The Rabbit 4000 has several advantageous features for use in the Fuel Data Unit 100:

6 Serial input/output (I/O) channels
  2 Input-capture channels, each with a 16-bit Timer
  2 Quadrature Encoder channels
  Up to 40 pins of I/O In addition, there are 8 channels of DMA (Direct Memory Access) and a fully functional Ethernet peripheral for future applications. The block diagram of the Rabbit 4000 is shown in FIG. 12, while the microprocessor and memory as implemented are shown in FIG. 13.

Preferably, four of the six serial channels in the Rabbit 4000 are used as follows: Serial Channel A—CMOS level signal to Wi-Fi module; Serial Channel B—CMOS level signal to A/D converter (RTD circuit) & EEPROM (SPI protocol); Serial Channel C—RS-232 channel for Communication to other systems; and Serial Channel D—RS-232 channel for Programming and Diagnostics.

IEEE 802.11b/g (Wi-Fi) communications can be accomplished with a dedicated-purpose module. One such module that can be adapted for use in the FDU 100 is Roving Networks' WiFly GSX, Model RN-131G, a stand alone, embedded wireless 802.11 networking device that comes in a small form factor and has low power consumption. The form factor of the Model RN-131G is shown in FIG. 14.

The WiFly GSX Model RN-131G module incorporates a 2.4 GHz radio, processor, TCP/IP stack, real-time clock, crypto accelerator, power management and analog sensor interfaces. It is preloaded with software to simplify integration and minimize development.

In its simplest configuration, the WiFly GSX Model RN-131G hardware requires only four connections (PWR, TX, RX, GND) to create a wireless data connection. The WiFly GSX module is programmed and controlled with a simple ASCII command language. Once the WiFly GSX is setup, it can scan to find an access point, associate, authenticate and connect over any Wi-Fi network. A Block Diagram of the RN-131G is shown in FIG. 15.

The RN-131G comes in a 44-pin surface mount package. It has a small footprint and a U.FL connector for an external antenna. The dimensions are shown in FIG. 16. The Wi-Fi interface is implemented as shown in FIG. 17.

Preferably, there are two (2) RS-232 Interfaces available on the Fuel Data Unit 100, although those skilled in the art will recognize that fewer or more such interfaces can be provided. The example interfaces are as listed and described below:

Programming/Diagnostic Interface
  Electronic Meter Interface
  High Visibility Display Interface
  Printer Interface The Programming/Diagnostics interface is to perform diagnostics using a notebook PC. A field technician or engineer can be view and modify all data registers via this interface.

An Electronic Meter Interface is used for communications with Electronic Meter Registers. The FDU 100 has the hardware capability to interface to external systems. For example, two meter interfaces can be supported: one for the Model LCR-II from Liquid Controls of Lake Bluff, Ill. and one for the EMR3 from Veeder-Root.

A High Visibility Display Interface is used for connection to a device with a large numerical display that is designed to be able to see the amount of fuel dispensed from a long distance from the fuel transfer apparatus such as the MultiDisplay provided by QT Technologies of Dallas, Tex.

A Printer Interface is used to drive a thermal or impact printing device that provides a paper record of the fueling transaction such as an Epson TM-U295 slip printed from Epson America, Inc. of Long Beach Calif.

The FDU 100 communicates with Electronic Meter Registers using an RS-232, RS-485 or similar interface. This is useful in applications where there is a mixture of mechanical and electronic meter registers and a single solution is desired. The Serial Communications can be implemented as shown in FIG. 18.

In addition to wireless communications, an important function of the FDU is totalization of fuel mass and volume data from the pulse input channels. An external pulse transmitter transmits pulse signals to these channels, which are proportional to the quantity of fuel transferred through airport fueling handling equipment. The FDU can interface with pulse signals ranging from 3 to 30 VDC, at a maximum frequency of 30 KHz.

Veeder-Root and Liquid Controls lead the market in meter registers used in airport fueling applications. Both Veeder-Root and Liquid Controls market pulse transmitters, typically the below:

Veeder Root Model 1871 Pulse Transmitter
Liquid Controls Pulse Output Device

The FDU 100 is not limited to these two mechanical register products and can interface to any device capable of providing pulse data.

An energy-limiting circuit restricts the amount of energy that can be delivered to the FDU pulse channels from an external device. The two (2) pulse input signals are connected to the FDU by a plug-able terminal block. An opto-coupler provides isolation from the input signal to the FDU's electronics, as well as isolation between the two channels. The opto-coupler also provides a 30 KHz input band limiting. The pulse totalization is performed by hardware timers/totalizers integrated into the microprocessor.

The Pulse Input is implemented using an opto-coupler. The schematic for such is shown in FIG. 19.

The FDU 100 can interface to pulse transmitters capable of outputting a quadrature-encoded signal as shown in FIG. 20. In this case, the two pulse channels act as a single signal which provides not only volume data but direction of flow as well.

The Rabbit 4000 microprocessor has two built-in quadrature decoder inputs, but only one is used in the example design. A configuration parameter determines whether the two pulse inputs are independent or grouped together as a single quadrature channel. Liquid Controls' Pulse Output Device and Veeder-Root's solid-state version of the Model 1871 Pulse Transmitter are capable of providing a quadrature output.

The FDU 100 has two (2) Digital Input/Output (I/O) channels, which can be used for a variety of purposes:
Overfill control
Flow switch status
Pressure switch status For flexibility, plug-in modules from Grayhill or Opto-22 can be used. These modules available are for both digital inputs and digital outputs, in AC and DC versions. The operating temperature is −40° C. to 100° C. All modules provide an optically-isolated barrier between sensitive microprocessor or digital logic circuits and field power devices. Grayhill's 70M "Mini" series and Opto-22's MP series packaging is designed with a minimum footprint to allow maximum relay density on the printed circuit board.

Since AC power is typically not available on fueling vehicles and fueling carts, this example design focuses on DC-powered versions. If an alternating current is needed in a particular application, one could select the appropriate module from Opto-22 or Grayhill.

Digital input modules are used to monitor the status of a load or a sensor (such as a limit switch, pressure switch or temperature switch). The output of these modules is a logic level signal which corresponds to the status of the device being monitored. A high level output signal indicates the load is off (the switch is open). While, a low level output signal indicates the load is on (the switch is closed). Input modules are designed to give fast, clean switching by providing filtering and hysteresis.

Digital output modules are used to switch AC and DC loads such as solenoids, motors, or lamps from logic signal levels. Their inputs are directly compatible with TTL or CMOS interface circuitry.

A Resistance Temperature Detector (RTD) circuit is used for measuring temperature in a 3-wire configuration as shown in FIG. 21. The voltage across the Bridge Output, $V_b$, is measured using a Linear Technology LTC 2422 A/D converter. The LTC 2422 is an ultra-low-power, high-resolution, low-speed, serial-output ADC. It provides a high-accuracy internal oscillator, which requires no external components, and operates over a −40C to +85C temperature range. The BLTC 2422 is depicted in the block diagram of FIG. 22A. The RTD circuit is implemented as shown in FIG. 22B. The measured temperature is used to calculate the density of the flowing fuel and to calculate the exact amount of fuel dispensed at standard temperature.

All FDU electronics are housed in an instrument enclosure manufactured by Killark, Catalog Number HKB-B, as shown in FIG. 5D. As shown therein, the instrument enclosure is substantially cylindrical, has a removable cover, and has a pair of co-aligned explosion-proof cable ports.

The Operating Temperature of the assembled unit is determined by the temperature range of its components. The ranges of the major components are provided in the table of FIG. 23.

FIG. 24 is a schematic illustration of the operation of the fueling data of FIG. 4 and shows the wireless relaying of the fuel order quantity to the fueling data unit, which converts the order quantity into a maximum number of pulses to achieve that fuel order quantity.

FIG. 25 is a schematic illustration of the operation of the fueling data of FIG. 4 and shows that when the maximum number of pulses is reached, the interface of the fueling data unit to the pneumatic solenoid valve system shuts off the flow of fuel.

A fuel order quantity for a specific flight is sent from the remote computer to the local computer wirelessly as shown in FIG. 24. This value is the amount of fuel desired to be on the aircraft after the fueling is complete. The local computer computes the quantity of fuel to be dispensed which is the order quantity less the amount of fuel that is already on board and relays that wirelessly to the fueling data unit. The fueling data unit converts the to-be-dispensed fuel quantity into a maximum pulse count from the pulser. The fueling data unit counts the number of pulses from the pulser and when the maximum pulse count is reached, the fueling data unit relays (transmits) a signal to a pneumatic solenoid valve that closes as shown in FIG. 25. This fuel shut off can be accomplished by tripping a relay (changing the relay's state to stop the flow of fuel). This prevents overfilling and limits the fuel dispensed to just that needed to meet the order quantity.

Optionally, the fueling data collection unit 100 monitors the maintenance status of the fuel transfer apparatus and is operable for communicating the monitored maintenance status to a remote computer by relaying it through a local computing device. For example, the fueling data collection unit can monitor the maintenance status of one or more fuel filters in the fuel transfer apparatus by monitoring fuel pressures upstream and downstream of the filter(s) to determine whether the filter(s) is clogged and needs to be replaced.

Optionally, the battery-powered fueling data collection unit can be operative to monitor the functioning status of the fuel transfer apparatus and for communicating the monitored functioning status to a remote computer by relaying the information through a local computer.

Optionally, the battery-powered fueling data collection unit's fueling data interface module has multiple input ports, at least one for connection to a fueling meter with a mechanical register using pulses and one for connection to an electronic register.

Advantageously, the communications module can be used to download updated firmware and/or software from a remote computer relayed through a local computing device. Moreover, the communications module can be used to send fueling data to and from a remote computer relayed through a local computing device. Further, the communications module can be used to communicate operating conditions of the fueling operation and fueling data to a remote computer relayed through a local computing device.

Advantageously, the fueling data collection unit monitors the maintenance status of one or more fuel filters in the fuel transfer apparatus by monitoring fuel pressures upstream and downstream of the filter(s) to determine whether the filter(s) is clogged and needs to be replaced. If the filter(s) needs to be replaced, the data collection unit can send a message to a local computer (or to a remote computer through a local computer) informing that the filter needs to be replaced.

Optionally, the communications module communicates fuel custody transfer quantities and non-fuel data. Preferably, the non-fuel data includes one or more of maintenance status of the fuel transfer apparatus, operating status of the fuel transfer apparatus, and power status of the fueling data collection unit.

Advantageously, the fueling data collection unit can provide important control functions, as described above. In addition, the unit can advantageously perform diagnostics and firmware configuration changes/updates via Wi-Fi without any need to remove the top of the enclosure to make such changes.

While the above-described example embodiments have been described in some instances with reference to specific components made by specific manufacturers, those skilled in the art will appreciate that the invention is not to be limited to those specific components or manufacturers and that various substitutions can be made therefor. Moreover, while the above description refers to the use of pulsers, other types of flow measurement devices can be used as well. Furthermore, while the above description refers to the use of fuel carts, other types of fueling equipment can be used as well.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A fueling data collection unit for use with a fuel meter and a register of the type having a pulser and associated with a fuel transfer apparatus and for use with a system for managing fueling transactions of a fleet operator using fuel transfer apparatuses at a single or multiple locations, the fueling data collection unit comprising:
   a fueling data interface module for receiving fueling information from the meter register and/or pulser; and
   a temperature compensation module for using the density of the fuel at a standard temperature and measured fuel temperature data to compensate for a volume variance of the fuel as a result of temperature variance from the standard temperature data to determine a volume correction factor at the measured fuel temperature, the temperature compensation module using the measured fuel temperature to determine a compensated, more accurate volume and/or mass of fuel dispensed through the fuel meter.

2. The fueling data collection unit of claim 1 wherein a fuel order quantity is converted into a maximum pulse count set point and when that maximum pulse count set point is reached, the fueling data unit transmits a signal to discontinue the flow of fuel.

3. The fueling data collection unit of claim 1 wherein the compensated, more accurate volume and/or mass of fuel dispensed through the fuel meter is used in conjunction with a pre-ordered refueling quantity to prevent the fuel transfer apparatus from transferring more than a pre-ordered refueling quantity.

4. The fueling data collection unit of claim 1 wherein the fuel transfer apparatus is used to refuel aircraft and wherein the aircraft is scheduled to receive a specific, pre-determined quantity of fuel by mass and/or volume, and wherein the compensated, more accurate volume and/or mass of fuel dispensed through the fuel meter is used to prevent the fuel transfer apparatus from transferring more than the pre-determined volume and/or mass of fuel to the aircraft.

5. The fueling data collection unit of claim 1 wherein unit is battery powered.

6. A fueling data collection unit for use to dispense fuel according to a fueling order and avoid over-filling the fueling order, the fueling data collection unit comprising:
   a fueling data interface module for receiving measured fuel temperature data; and
   a temperature compensation module for using fuel density information at standard temperature and the measured fuel temperature data to compensate for a fuel volume variance of the dispensed fuel as a result of a fuel temperature variance from the standard temperature fuel density data to determine a volume correction factor based on the measured fuel temperature data and the standard temperature fuel density data, the temperature compensation module using the volume correction factor to determine a temperature-compensated more-accurate quantity of the dispensed fuel to avoid over-filling the fueling order.

7. The fueling data collection unit of claim 6 wherein the fueling data collection unit is for use with a fuel meter and a register having a pulser, and wherein the fueling data interface module receives the measured fuel temperature data for the dispensed fuel from the meter, the pulser, or both.

8. The fueling data collection unit of claim 6 wherein the temperature-compensated more-accurate quantity of dispensed fuel is defined by fuel volume, fuel mass, or both.

9. The fueling data collection unit of claim 6 wherein the fueling order defines a pre-ordered fuel quantity that is converted into a maximum pulse-count set point, and wherein in response to the maximum pulse-count set point being reached, the fueling data collection unit transmits a signal to discontinue the flow of the dispensed fuel.

10. The fueling data collection unit of claim 6 wherein the temperature-compensated more-accurate quantity of dispensed fuel is compared to the pre-ordered refueling quantity to prevent a fuel transfer apparatus from transferring more than the pre-ordered refueling quantity.

11. The fueling data collection unit of claim 6 wherein a fuel transfer apparatus is used to refuel an aircraft and wherein the aircraft is scheduled to receive the pre-ordered quantity of fuel by mass, volume, or both, and wherein the temperature-compensated more-accurate quantity of dispensed fuel is used to prevent the fuel transfer apparatus from transferring more than the pre-ordered quantity of fuel to the aircraft.

12. A fueling data collection unit for use to dispense fuel according to a fueling order and avoid over-filling the fueling order, the fueling data collection unit comprising:

a fueling data interface module for receiving measured fuel temperature data; and a temperature compensation module for determining a volume correction factor based on fuel density information at standard temperature and the measured fuel temperature data, and using the volume correction factor to compensate for a fuel volume variance of the dispensed fuel as a result of a fuel temperature variance from the standard temperature fuel density data by using the volume correction factor to determine a temperature-compensated more-accurate quantity of the dispensed fuel to avoid over-filling the fueling order.

13. The fueling data collection unit of claim 12 wherein the fueling data collection unit is for use with a fuel meter and a register having a pulser, and wherein the fueling data interface module receives the measured fuel temperature data for the dispensed fuel from the meter, the pulser, or both.

14. The fueling data collection unit of claim 12 wherein the temperature-compensated more-accurate quantity of dispensed fuel is defined by fuel volume, fuel mass, or both.

15. The fueling data collection unit of claim 12 wherein the fueling order defines a pre-ordered fuel quantity that is converted into a maximum pulse-count set point, and wherein in response to the maximum pulse-count set point being reached, the fueling data collection unit transmits a signal to discontinue the flow of the dispensed fuel.

16. The fueling data collection unit of claim 12 wherein the temperature-compensated more-accurate quantity of dispensed fuel is compared to the pre-ordered refueling quantity to prevent a fuel transfer apparatus from transferring more than the pre-ordered refueling quantity.

17. The fueling data collection unit of claim 12 wherein a fuel transfer apparatus is used to refuel an aircraft and wherein the aircraft is scheduled to receive the pre-ordered quantity of fuel by mass, volume, or both, and wherein the temperature-compensated more-accurate quantity of dispensed fuel is used to prevent the fuel transfer apparatus from transferring more than the pre-ordered quantity of fuel to the aircraft.

* * * * *